(12) United States Patent
Nixon et al.

(10) Patent No.: US 7,378,362 B2
(45) Date of Patent: May 27, 2008

(54) BORON CARBIDE BASED CERAMIC MATRIX COMPOSITES

(75) Inventors: Thomas Dwayne Nixon, Akron, OH (US); Sai-Kwing Lau, Broadview Heights, OH (US); Edward R. Stover, Akron, OH (US); Salvatore J. Calandra, Macedonia, OH (US); Vijay V. Pujar, Strongsville, OH (US); Lanny Ritz, Tallmadge, OH (US); Gary L. Clark, Maplewood, OH (US); Steve T. Keller, Union, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/693,425

(22) Filed: Oct. 24, 2003

(65) Prior Publication Data

US 2004/0192534 A1 Sep. 30, 2004

Related U.S. Application Data

(63) Continuation-in-part of application No. 10/452,009, filed on Jun. 2, 2003, now Pat. No. 6,855,428, which is a continuation of application No. 09/676,250, filed on Sep. 29, 2000, now abandoned, application No. 10/693,425.

(60) Provisional application No. 60/475,991, filed on Jun. 5, 2003.

(51) Int. Cl.
  *C04B 35/80* (2006.01)
  *B32B 17/12* (2006.01)

(52) U.S. Cl. ................ 501/95.2; 501/90; 501/92; 428/293.4; 428/294.1

(58) Field of Classification Search ................ 501/88, 501/95.2, 90, 91, 92; 428/293.4, 294.1
See application file for complete search history.

(56) References Cited

U.S. PATENT DOCUMENTS 4,790,052 A 12/1988 Olry (Continued)

FOREIGN PATENT DOCUMENTS

JP 05 105868 4/1993

(Continued)

OTHER PUBLICATIONS

R.W. Froberg and B.A. Grider, "High Friction Carbon/Carbon Aircraft Brakes," 40th Int. SAMPE Symp. May 8, 1995, Extended Abstracts, pp. 942-944.

(Continued)

*Primary Examiner*—Karl Group
(74) *Attorney, Agent, or Firm*—Brinks Hofer Gilson & Lione

(57) ABSTRACT

The present invention is a composite material, a process and a product formed by the process. The composite is formed by a process that includes forming a fibrous structure comprising fibers into a preform, coating the fibers of the fibrous structure preform with elemental carbon to impregnate that preform, infiltrating the preform with boron carbide to form an impregnated green body. The impregnated green body is infiltrated with liquid naphthalene or other carbon precursor, which is thereafter pyrolyzed to form a carbon char. Then, the char infiltrated green body is infiltrated with molten silicon to form a continuous matrix throughout the composite. The silicon in the continuous matrix is reacted with the carbon char to form silicon carbide.

18 Claims, 16 Drawing Sheets

U.S. PATENT DOCUMENTS

| | | | |
|---|---|---|---|
| 4,815,572 A | 3/1989 | Froberg et al. | |
| 4,886,682 A | 12/1989 | Singh et al. | |
| 4,889,686 A | 12/1989 | Singh et al. | |
| 4,915,760 A | 4/1990 | Singh et al. | |
| 4,931,311 A | 6/1990 | Singh et al. | |
| 4,944,904 A | 7/1990 | Singh et al. | |
| 4,981,822 A | 1/1991 | Singh et al. | |
| 5,007,508 A | 4/1991 | Lacombe | |
| 5,021,367 A | 6/1991 | Singh et al. | |
| 5,043,303 A | 8/1991 | Singh et al. | |
| 5,051,301 A | 9/1991 | Singh et al. | |
| 5,067,998 A | 11/1991 | Singh et al. | |
| 5,160,676 A | 11/1992 | Singh et al. | |
| 5,217,770 A | 6/1993 | Morris, Jr. et al. | |
| 5,296,311 A | 3/1994 | McMurtry et al. | |
| 5,312,660 A | 5/1994 | Morris et al. | |
| 5,330,854 A | 7/1994 | Singh et al. | |
| 5,376,427 A | 12/1994 | Singh et al. | |
| 5,387,299 A | 2/1995 | Singh et al. | |
| 5,407,734 A | 4/1995 | Singh et al. | |
| 5,432,253 A | 7/1995 | Singh et al. | |
| 5,436,042 A | 7/1995 | Lau et al. | |
| 5,480,678 A | 1/1996 | Rudolph et al. | |
| 5,484,655 A | 1/1996 | Lau et al. | |
| 5,515,585 A | 5/1996 | Sheehan et al. | |
| 5,546,850 A | 8/1996 | Zaveri | |
| 5,581,857 A | 12/1996 | Sheehan et al. | |
| 5,643,514 A | 7/1997 | Chwastiak et al. | |
| 5,662,855 A | 9/1997 | Liew et al. | |
| 5,688,577 A | 11/1997 | Smith et al. | |
| 5,740,593 A | 4/1998 | Sheehan et al. | |
| 5,792,715 A | 8/1998 | Duval et al. | |
| 5,817,432 A | 10/1998 | Chwastiak et al. | |
| 5,840,221 A | 11/1998 | Lau et al. | |
| 5,853,485 A | 12/1998 | Rudolph et al. | |
| 5,858,890 A | 1/1999 | Sheehan et al. | |
| 5,869,411 A | 2/1999 | Bazshushtari et al. | |
| 5,878,849 A | 3/1999 | Prunier, Jr. et al. | |
| 5,908,792 A | 6/1999 | Sheehan et al. | |
| 5,945,062 A | 8/1999 | Chwastiak et al. | |
| 5,962,103 A * | 10/1999 | Luthra et al. | 428/107 |
| 6,029,327 A | 2/2000 | Sheehan et al. | |
| 6,237,203 B1 | 5/2001 | Sheehan et al. | |
| 6,309,703 B1 | 10/2001 | Wapner et al. | |
| 6,405,417 B1 | 6/2002 | Sheehan et al. | |
| 6,506,483 B1 * | 1/2003 | Fehrenbacher et al. | 428/293.4 |
| 6,537,654 B1 * | 3/2003 | Gruber et al. | 428/293.4 |
| 6,773,528 B2 * | 8/2004 | Tani | 156/89.26 |
| 2004/0058154 A1 * | 3/2004 | Lau et al. | 428/408 |

FOREIGN PATENT DOCUMENTS

| | | | |
|---|---|---|---|
| JP | 2000-256064 | | 9/2000 |
| JP | 2000256064 | * | 9/2000 |
| WO | WO 98/24737 | | 6/1998 |
| WO | WO 02/28801 | | 4/2002 |

OTHER PUBLICATIONS

W. Krenkel "CMC Materials for High Performance Brakes," ISTA Conference on Supercars, Aachen Oct. 31-Nov. 4, 1994 (paper from the German Aerospace Research Establishment Institute of Structures and Designs), Stuttgart, Germany.

Vijay Vasant Pujar, *Processing and Microstructural Characterization of Reaction-Formed Silicon Carbide (RFSC) and Computer Simulations, X-Ray Diffraction and High Resolution Transmission Electron Microscopy of Stacking Faults in β-SiC*, Case Western Reserve University Dissertation, Jan. 1997, pp. 38-51.

* cited by examiner

BORON CARBIDE BASED CERAMIC MATRIX COMPOSITES

RELATED APPLICATION

This non-provisional application is a continuation-in-part of U.S. patent application Ser. No. 10/452,009, filed on Jun. 2, 2003 now U.S. Pat. No. 6,855,428, which is a continuation of U.S. patent application Ser. No. 09/676,250, filed Sep. 29, 2000 now abandoned. In addition, this non-provisional application also claims the benefit of and incorporates by reference, in its entirety, U.S. provisional patent application serial No. 60/475,991, filed on Jun. 5, 2003.

FIELD OF INVENTION

The present invention relates generally to ceramic matrix composites and more specifically to boron carbide based ceramic matrix composites for application to aircraft braking systems. More, particularly, this invention relates to a ceramic matrix composite generally having fine grain structure.

BACKGROUND OF THE INVENTION

Current aircraft braking systems utilize either steel or carbon disks that serve as the friction materials and heat sinks. Steel-based systems were originally used as brake materials, until the emergence of carbon-carbon (C—C) composite materials in the 1970s. C—C composites are now the state-of-the-art material for aircraft brake heat sinks and are being used in the vast majority of new military and large commercial aircraft programs.

Ceramic Matrix Composites (CMCs) exhibit some extraordinary thermal and mechanical properties and hold the promise of being outstanding materials for aircraft brake friction applications, as well as attractive candidates for the next generation heat sink materials for such applications. A particular CMC system that indeed possesses the potential for use as a next generation aircraft brake material, and offers potential breakthrough performance, has recently been identified. In particular, brake materials based on a boron carbide matrix composite melt infiltration system have been shown to offer extremely attractive benefits relative to both steel and carbon brake materials.

As a class of materials, ceramics are known to possess low density in comparison to steel and other metal alloys, high hardness and high oxidation resistance; some of them also have attractive heat capacity and thermal conductivity. Compared to the C—C used today, ceramics have the potential of providing some key performance advantages in terms of reduced wear rate, enhanced oxidation resistance, and reduced heat sink weight and/or volume.

The earliest attempts to use using ceramics for aircraft braking system applications were based on monolithic ceramics and cermets. However, none of these attempts were successful. The major cause for the resultant failures was due to the inadequate mechanical properties, especially low impact resistance and low fracture toughness, in conjunction with the well-known characteristic brittleness of ceramics. Thus, activities on the next-generation heat sink materials for aircraft braking system applications have focused on the development of fiber-reinforced CMCs that would improve the fracture toughness and impact resistance (reducing the brittleness) while retaining the other advantages of ceramics.

The two prime candidate CMC material systems, identified for aircraft braking system heat-sink applications due to thermo-mechanical considerations, are based on silicon carbide (SiC) and boron carbide ($B_4C$). Between these two material systems, the $B_4C$-based CMCs have the particular attractions that $B_4C$ is the third hardest material known, with only diamond and cubic boron nitride being harder, and that it has a heat capacity greater than both SiC and carbon. However, $B_4C$-based fiber-reinforced CMCs suitable for aircraft brake application had not been made due to processing difficulties associated with $B_4C$. Generally, previous attempts to make $B_4C$-based CMCs were limited to materials without fiber reinforcements. For example, U.S. Pat. No. 5,878,849 issued Mar. 9, 1999, describes a cermet material made by infiltrating a pressed preform of $B_4C$ powder (not filament or fiber) with aluminum.

Silicon-filled CMCs have been reported in both U.S. and foreign literature to show improved friction coefficients and/or wear life in certain configurations. See, for example: R. W. Froberg and B. A. Grider, "High Friction Carbon/Carbon Aircraft Brakes", 40th Int. SAMPE Symp., May 8 11, 1995, extended abstracts, pp 942-944; R. W. Froberg and T. E. Pratt, "Brake System with Improved Brake Material", U.S. Pat. No. 4,815,572 issued Jul. 24, 1987 (assigned to Parker Hannifin Corp); W. Krenkel, "CMC Materials for High Performance Brakes", ISTA Conference on Supercars, Aachen, 31 Oct.-4 Nov. 1994 (paper from the German Aerospace Research Establishment Institute of Structures and Design), Stuttgart; A. Lacombe, "Friction System Using Refractory Composite Material", U.S. Pat. No. 5,007,508 issued Apr. 15, 1991 (assigned to SEP, France).

In 1994, the German Aerospace Research Establishment reported sub-scale dynamometer results on a C—C+SiC composite which showed improved stability, lower wear, and shorter processing times than C—C materials. (See W. Krenkel, ibid.) Pyrolyzed resin impregnated carbon fiber preforms, infiltrated with Si at 1500° C., yielded composites containing ~35% SiC by weight. Friction coefficients varied between 0.2 and 1.0, higher than for C—C under comparable conditions, increasing with decreasing velocity. Wear was not affected by temperature up to 900° C.

Lower net wear rates as compared to two carbon-carbon disks wearing against each other were disclosed in U.S. Pat. No. 5,007,508 covering aircraft brakes in which a C—C composite disk is worn against a disk containing carbon or SiC fibers and the CVI matrix consists of SiC as the principal phase with minor amounts of C or BN on the fibers.

While the foregoing examples illustrate the potential advantages of Si-based CMC's, few of these claims have been independently substantiated. Very often, the friction and wear (F&W) test duty cycle, including load, pressure, or length of testing time and number of cycles were either not reported, or were far less severe than those demanded under realistic aircraft braking conditions. Furthermore, many of these examples only cited either the friction or the wear results, by themselves, instead of the more relevant combined F&W data.

Certain CMC systems are disclosed in a series of U.S. patents issued to Singh et al., assigned to The General Electric Company. Those patents all disclosed the use, inter alia, of carbon fiber preforms, and in some embodiments the use of boron carbide is described. These General Electric patents fall generally into one of two groups. Some of these patents describe the production of solid state sintered ceramic bodies, wherein the composite matrix is densified by hot-press sintering, and where the final sintered body is reduced in size from the body before sintering. Those patents, generally unsuitable for producing complex, near-net shape ceramic matrix components, are: U.S. Pat. No.

4,886,682, "Process for Producing a Filament-Containing Composite in a Ceramic Matrix", issued Dec. 12, 1989; U.S. Pat. No. 4,915,760, "Method of Producing a Coated Fiber-Containing Composite", issued Apr. 10, 1990; U.S. Pat. No. 4,931,311, "Method of Obtaining a Filament-Containing Composite with a Boron Nitride Coated Matrix", issued Jun. 5, 1990; U.S. Pat. No. 5,051,301, "Coated Fiber-Containing Composite", issued Sep. 24, 1991; U.S. Pat. No. 5,067,998, "Fibrous Material-Containing Composite", issued Nov. 11, 1991; U.S. Pat. No. 5,160,676, "Fibrous Material-Containing Composite", issued Nov. 3, 1992; and U.S. Pat. No. 5,407,734, "Fiber-Containing Composite", Apr. 18, 1995.

The other General Electric patents, as referred to above, disclose the infiltration of a porous body with a molten silicon infiltrant. These patents require that the fibrous materials are coated entirely with boron nitride to avoid a reaction and bonding between the silicon infiltrant and the fibrous material, and to retain fiber pull-out capabilities and fracture toughness. Those patents are U.S. Pat. No. 4,889,686, "Composite Containing Coated Fibrous Material", issued Dec. 26, 1989; U.S. Pat. No. 4,944,904, "Method of Obtaining a Fiber-Containing Composite", issued Jul. 31, 1990; U.S. Pat. No. 4,981,822, "Composite Containing Coated Fibrous Material", issued Jan. 1, 1991; U.S. Pat. No. 5,021,367, "Fiber-Containing Composite", issued Jun. 4, 1991; U.S. Pat. No. 5,043,303, "Filament-Containing Composite", issued Aug. 27, 1991; U.S. Pat. No. 5,330,854, Filament-Containing Composite", issued Jul. 19, 1994; U.S. Pat. No. 5,376,427, "Ceramic Composite Containing Coated Fibrous Material", issued Dec. 27, 1994; U.S. Pat. No. 5,387,299, "Ceramic Composite Containing Coated Fibrous Material", issued Feb. 7, 1995; and U.S. Pat. No. 5,432,253, "Composite Containing Fibrous Material", issued Jul. 11, 1995.

In summary, prior to the present invention, there was no known practical processing technique for producing dense, fiber-reinforced $B_4C$ based CMCs having a fine grain microstructure and process for forming such composites. Preferably, the boron carbide particulates are maintained in submicron size in the CMC. Also, desirably, the growth of SiC crystals (grains) in the CMC above 10 microns is prevented, most preferably the growth of SiC crystals above 5 microns is prevented. The term micron as used herein is synonymous with the term micrometer.

SUMMARY OF THE INVENTION

The present invention is a composite material, which comprises a fibrous structure. The fibrous structure comprising fibers are initially predominantly coated with elemental carbon to impregnate the fibrous structure. The fibers are then subsequently preferably predominantly infiltrated with at-least-one ceramic material, which is non-reactive with silicon, such as boron carbide, to form an impregnated green body. The infiltration can occur by slurry soaking or slurry casting. The green body is infiltrated with a liquid carbon precursor, such as liquid naphthalene and pyrolyzed to form a carbon char. A silicon matrix, which is continuous, predominantly surrounds and encompasses, the fibrous structure, which had been initially predominantly impregnated with elemental carbon, subsequently predominantly infiltrated with a ceramic material and liquid carbon precursor prior to being pyrolyzed. The matrix ceramic material preferably has a fine grain crystalline structure of predominantly 20 microns or less in size. The at-least-one ceramic material is preferably discontinuous within that matrix. The final material maintains its ability to fail by the mechanisms normally observed for ceramic matrix composites including fiber pull-out. As used herein, the word "predominantly" means, generally more so than not, or more often than not, depending on the context.

The composite material of the present invention preferably comprises a fibrous structure of elemental carbon, which is initially predominantly impregnated with elemental carbon, and then subsequently infiltrated with boron carbide by slurry soaking or slurry casting. The fibrous structure is then infiltrated with liquid naphthalene or other liquid carbon precursor and pyrolyzed to carbon char. Then, preferably, a silicon alloy matrix is added. That silicon alloy matrix, which is continuous, predominantly encompasses the fibers of the fibrous structure, which have been predominantly impregnated with elemental carbon, soaked with boron carbide and infiltrated with liquid naphthalene prior to being pyrolyzed to form a carbon char. Thermal annealing is carried out to react the carbon with silicon. Preferably, the matrix ceramic material of this composite has a fine grain crystalline structure of predominantly 20 microns or less in size to produce the desired wear characteristics which are hereinafter described. Also, the matrix ceramic material preferably has less than 5 vol. % silicon. To optimize the wear characteristics, it has been found that the boron carbide should preferably be discontinuous within the matrix. To optimize wear, the boron carbide needs to be uniformly distributed throughout the composite. The boron carbide will be discontinuous due to the fact that it is added by soaking or casting and does not react or recrystallize to form a continuous phase.

The present invention also includes a process for producing the foregoing composite material comprising:

a.) forming a fibrous structure comprising fibers into a preform;

b.) initially impregnating the fibers of that fibrous structure preform with elemental carbon;

c.) subsequently infiltrating by slurry soaking or slurry casting the fibers of that fibrous structure preform with at least one ceramic material, which is preferably non-reactive with silicon, to form an impregnated green body,;

d.) infiltrating that green body with liquid naphthalene or other form of liquid carbon precursor and pyrolyzing the liquid carbon precursor to form a carbon char;

e) infiltrating the impregnated green body with molten silicon to form a continuous matrix throughout the composite;

f) reacting silicon in the continuous matrix with the carbon char to form silicon carbide.

A composite material of this aspect of the present invention includes a matrix which is continuous and predominantly encompasses the fibrous structure which has been treated as described above. The at-least-one ceramic material is discontinuous within the matrix, and the fibrous structure pulls out of that elemental carbon (which initially predominantly impregnates the fibrous structure) when the composite material is subjected to fracture.

These and other features of the present invention will be further explained and demonstrated in the accompanying drawings and following detailed description of the invention, and are defined by the appended claims.

DETAILED DESCRIPTION OF THE INVENTION

Figure 1:
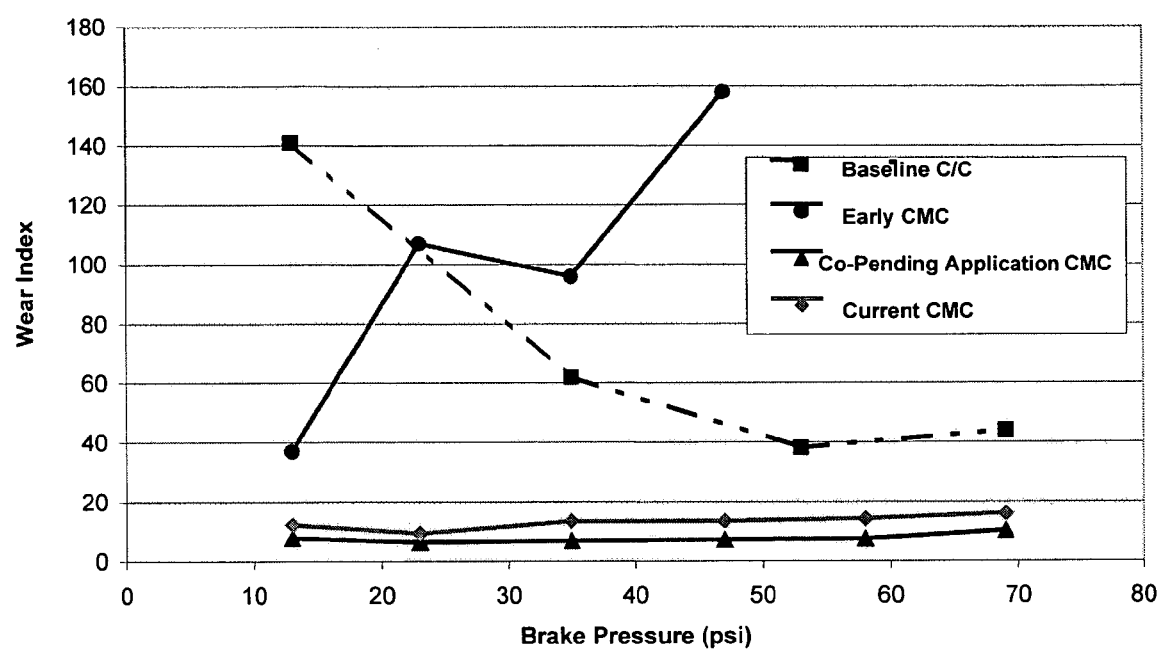
FIG. 1 is a graph comparing the wear rates of various $B_4C$ CMCs prepared in accordance with the process described in co-pending application, U.S. patent application Ser. No. 10/452,009, filed on Jun. 2, 2003, which is a continuation of U.S. patent application Ser. No. 09/676,250, filed Sep. 29, 2000, ("co-pending application") with each other and with CMCs prepared according to this invention as well as commercial C—C materials.

The present invention is a composite material which comprises a fibrous structure. The fibrous structure can be a plurality of elemental carbon fibers. Alternatively, the fibrous structure of the present invention can be a plurality of either non-oxide ceramic fibers or oxide ceramic fibers. Examples of suitable fibers which can be used in the present invention include pitch-based carbon fibers, polyacrylonitrile ("PAN") fibers, Rayon fabric-based carbon fibers, and both oxide and non-oxide ceramic fibers. The fibers are formed into a preform. Methods to form preforms are described in the following patents: U.S. Pat. No. 5,869,411 to Bazshushtari et al., issued Feb. 9, 1999; U.S. Pat. No. 5,853,485 to Rudolph et al., issued Dec. 29, 1998; U.S. Pat. No. 5,688,577 to Smith et al., issued Nov. 18, 1997; U.S. Pat. No. 5,609,707 to Bazshushtari et al., issued Mar. 11, 1997; U.S. Pat. No. 5,515,585 to Sheehan et al., issued May 14, 1996; U.S. Pat. No. 5,480,678 to Rudolph et al., issued Jan. 2, 1996; U.S. Pat. No. 5,312,660 to Morris et al., issued May 17, 1994; U.S. Pat. No. 5,217,770 to Morris, Jr. et al., issued Jun. 8, 1993; U.S. Pat. No. 5,662,855 to Liew et al., issued Sep. 2, 1997; U.S. Pat. No. 5,546,850 to Ronyak et al., issued Aug. 20, 1992, U.S. Pat. No. 5,792,715 to Duval et al., issued Aug. 19, 1998 and U.S. Pat. No. 4,790,052 to Orly, issued Jun. 23, 1986. Any of these methods can be used provided that a porous preform, having the desired porosity is formed. Preferably, the preform has fiber volumes ranging from about 20 to about 30 volume percent and a Z-fiber content of about 5% to about 10% of the total fiber volume. Preferably the 3D preform is made from PAN based carbon fibers. An example of a suitable PAN fiber is Pyron® fiber, available from Zoltek, Inc. of St. Louis, Mo. Preferably, the fiber is made into a preform. A substantially homogenous preform of needle punched PAN fiber tow is assembled in accordance with the teachings of U.S. Pat. No. 6,405,417 to Sheehan et al., issued Jan. 18, 2002; U.S. Pat. No. 6,237,203 to Sheehan et al., issued May 29, 2001; U.S. Pat. No. 6,029,327 to Sheehan et al., issued Feb. 29, 2000; U.S. Pat. No. 5,908,792 to Sheehan et al., issued Jun. 1, 1999; U.S. Pat. No. 5,858,890 to Sheehan et al., issued Jan. 12, 1999; U.S. Pat. No. 5,740,593 to Sheehan et al., issued Apr. 21, 1998; U.S. Pat. No. 5,662,855 to Sheehan et al., issued Sep. 2, 1997; U.S. Pat. No. 5,5,581,857 to Sheehan et al., issued Dec. 10, 1996; U.S. Pat. No. 5,515,585 to Sheehan et al., issued May 14, 1996.

The at-least-one non-reactive ceramic material preferably comprises boron carbide. Alternatively, other ceramic materials which do not react with silicon can be used or they can be used in combination, depending on the wear and hardness properties desired in the final matrix composite which is produced. Any ceramic material may be used provided that reactivity does not produce recrystallization and the formation of SiC grains larger than 20 microns. Examples of such non-reactive ceramic materials which can be used are silicon nitride, boron nitride, aluminum carbide and aluminum oxide. Preferably, the ceramic material is in the form of small particles, preferably sub-micron particles are used. Small particles as used herein this paragraph with reference to the ceramic materials which can be added are particles less than 10 microns in size.

The silicon matrix of the present invention can be preferably formed from elemental silicon. Optionally, the silicon matrix may also be formed from a silicon alloy include other alloying elements such as Al, B, Ni, Ca, Fe, to modify other relevant chemical and/or physical properties of the ceramic matrix composites being produced. By examining the phase diagrams of the alloys formed, one of ordinary skill in the art can easily determine the amount of each component in the alloy. An example of an alloy that can be used is an alloy formed with 94 wt. % silicon, 5 wt. % boron and 1 wt. % carbon.

An initial elemental carbon coating essentially encapsulates each of the plurality of elemental carbon fibers of the fibrous structure. However, acceptable results in regard to fiber pull out have been obtained where the elemental carbon coating on the fibrous structure is significantly less than complete. The key is that the silicon matrix not be significantly reacted directly with the underlying fibrous structure. Thus, the fibers are not inhibited from pulling out from the matrix, specifically pulling out from the elemental carbon coating on the fibrous structure, when loading the structure to fracture and fracture occurs.

The elemental carbon coating is preferably chemically vapor deposited (CVD) elemental carbon, on the fibers. An example of such a process can be found in U.S. Pat. Nos. 5,853,485 and 5,480,678 to Rudolph. Any other known CVD process can be used in this invention. The desirable form of CVD carbon coating, on the carbon fiber preforms, is known in the industry as "Rough Laminar" CVD carbon. It is "crystalline" in nature but not true graphite or diamond. As it is heat treated to higher and higher temperatures, it becomes more graphitic in character. The CVD carbon is nearly 100% dense. Other forms of CVD carbon may or may not be present including "Smooth Laminar", "Gas Phase Nucleated", "Dark Laminar", as well as other forms which may result from the CVD carbon. After the deposition of carbon, the preform has a porosity in the range of about 20 to about 60 volume %. Preferably, such preform has an open porosity of about 35 volume % and a density of about 1.35 g/cc.

Alternatively, the carbon can be deposited on the fibers from non-CVD sources, such as for example but not limited to resin, or pitch. That is, the fiber bundle could be impregnated using processes including resin and pitch, while, followed directly or indirectly with heating to drive off the volatile matter and reduce the resin or pitch to more or less pure carbon, thus eliminating the need for CVD carbon treatment of the carbon bundles or preforms.

According to this invention, after the deposition of elemental carbon on the fibers, the fibrous preform is infiltrated with a ceramic material. Preferably, the ceramic material is boron carbide or a boron carbide slurry. Preferably, the boron carbide in the boron carbide slurry has an average particle size of less than about 1 micron. An example of a suitable boron carbide to be used in the slurry is Tetrabor® 3000 F boron carbide, available from the Wacker Chemical Corporation. The boron carbide slurry can include surfactants and dispersants such as ByK®-156 (also known as Disperbyk® 156) and Byk®-181 (also known as Disperbyk® 181) from ByK-Chemie.

The fibrous preform is infiltrated with a slurry containing a ceramic material. Preferably, the slurry is a boron carbide slurry. A preferred boron carbide slurry has 20 weight % boron carbide. Preferably, the fibrous preform is soaked in a tank containing the boron carbide slurry. Although the boron carbide is soaked into the preform, the porosity of the fibrous preform should be maintained to allow the silicon carbide matrix to form. Typically, the boron carbide is soaked into the preform for about 30 to about 60 minutes. The preferred soaking time is 45 minutes. The boron carbide is soaked under vacuum (about 30 in. Hg) until trapped air from the submerged part is removed. When the preform is first covered with the slurry, vigorous bubble generation is observed. As the preform is infiltrated, the rate of bubble formation decreases and finally stops. This soaking process can be repeated, if desired, after drying atmospherically or drying at a moderate temperature of about 100° C. in an oven or combination of both.

Other methods can be used to introduce the boron carbide slurry to the preform. An example of another method is slurry casting. Slurry casting is described in detail in co-pending application.

Alternatively, the ceramic material can be incorporated into a polymer or organic material and infiltrated into the porous preform. Preferably, the ceramic material is uniformly distributed in the polymer. For example, the boron carbide can be added to naphthalene. It is believed that particle loading levels ranging from about 10 to about 50 weight percent can be used in this embodiment, based upon the polymer or organic material used as a carrier.

In yet another alternative embodiment, the silicon carbide can be incorporated into the slurry containing boron carbide particles. It is believed that as much as 50% of the boron carbide solids in a slurry can replaced by silicon carbide. The slurry containing the ceramic material can be used during slurry casting or a slurry soaking step. The SiC particulates serve as seeds for SiC growth in situ by the reaction between carbon and silicon during the melt infiltration.

In yet a further embodiment, silicon powder is added to the slurry mixture. By adding silicon powder during the slurry soaking step, the silicon can be introduced into the interior of the part before the porosity of the part is diminished due to the slurry and naphthalene infiltration steps. The addition of the silicon powder should improve melt infiltration efficiency. During the melt infiltration, these silicon particles in the powder should melt and subsequently react with the naphthalene char to form SiC. Preferably, the slurry should not be comprised of more than 50 weight % silicon powder.

Alternatively, a polymer precursor containing carbon and boron is used instead of the boron carbide slurry and the liquid naphthalene. Upon pyrolysis of the polymer precursor, the porous preform contains a mixture of carbon and boron. In addition, a pore-former, such as for example but not limited to, ethylene glycol, can be added to the polymer precursor. This pore-forming agent volatilizes during the pyrolysis step and leaves voids in the preform. Similarly, silicon powder can be added to the precursor. It is believed that the addition of the silicon powder to the slurry would improve melt infiltration efficiency.

In the process of the instant invention, the boron carbide regulates the reaction of silicon and carbon to form silicon carbide, such that the formation of large grain silicon carbide particles greater than five microns in diameter is minimized. The presence of silicon carbide grains larger than 20 microns has been found to increase the wear rate of brake surfaces formed from the CMC of the instant invention. Materials with a dispersion of fine grained materials such as those of the instant invention wear much less than materials with large grains. Accordingly, the fine grain silicon carbide formed in the process described herein contributes to a reduction in the wear rate of the composite material.

Figure 10:
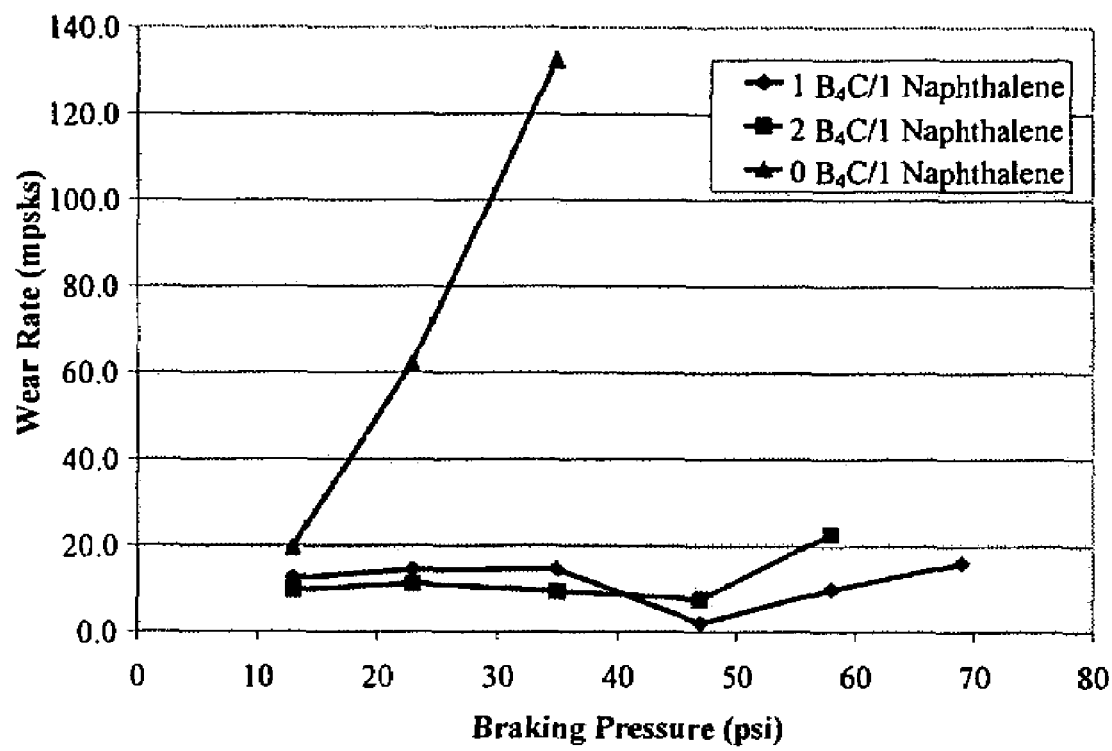
FIG. 10 is a graph illustrating the effect of boron carbide addition on the average wear rate of a CMC.
Figure 11:
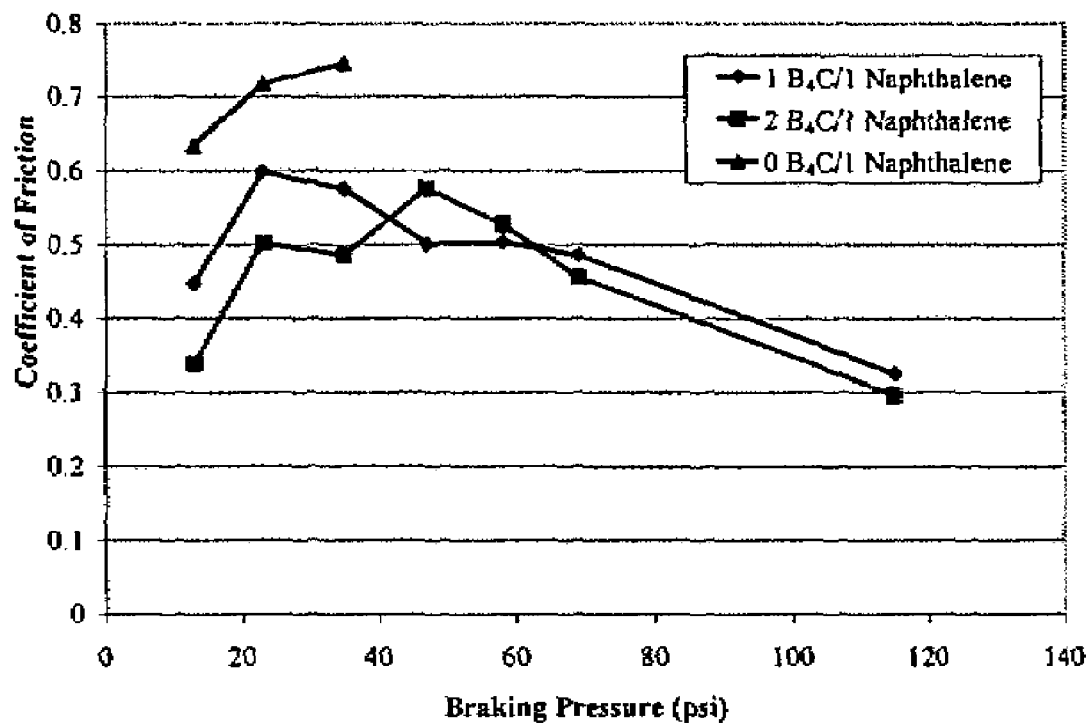
FIG. 11 is a graph illustrating the effect of boron carbide addition on the average coefficient of friction of a CMC sample.

FIGS. 10 and 11 illustrate the effect of the addition of boron carbide on the average wear rate and the average coefficient of friction on CMCs. As seen from the graphs, CMC samples with no boron carbide experienced higher wear. It is believed that higher wear is due to the presence of large SiC grains. The minimal level of boron carbide required in this invention is the amount needed to prevent large grain growth. As seen from the data, once that minimal level is achieved, the addition of more boron carbide does not greatly improve performance. The minimal level needed to prevent large grain growth can easily be determined by one of ordinary skill in the art.

If water has been used in the process, then the green body can be oven dried in air to remove any remaining water prior to further processing. The green body is dried in the temperature range of about 200 to about 600° F.; preferably the green body is dried in the range of about 400 to about 500° F.

Green body as used herein describes a carbon fiber preform which has been partially densified with elemental carbon and subsequently impregnated with a particulate ceramic material. The green body is then impregnated with a liquid carbon precursor and the carbon material is pyrolyzed to form a matrix of glassy carbon char. Examples of liquid carbon precursors which can be used include liquid naphthalene, molten phenolic resin and molten pitch. Preferably, naphthalene is used and is melted by heating the naphthalene to a temperature above its melting point. The formation of a carbon char from the pyrolysis of liquid naphthalene is described in U.S. Pat. No. 6,309,703, the disclosure of which is incorporated by reference herein. The carbon char provides the carbon source in the reaction of silicon to form silicon carbide. After pyrolysis, the added carbon increases the weight of the green body by about 10% to about 12%.

In another embodiment of the instant invention, the impregnation of the green body with naphthalene and pyrolysis of the naphthalene is repeated a second time. This embodiment is called "Current CMC, version 1." Alternatively, the impregnation with naphthalene and the pyrolysis of naphthalene can be repeated several times as desired in order to achieve the desired end results. However, preferably, a single impregnation of naphthalene and pyrolysis cycle is used. This embodiment is called "Current CMC, version 2."

Figure 12:
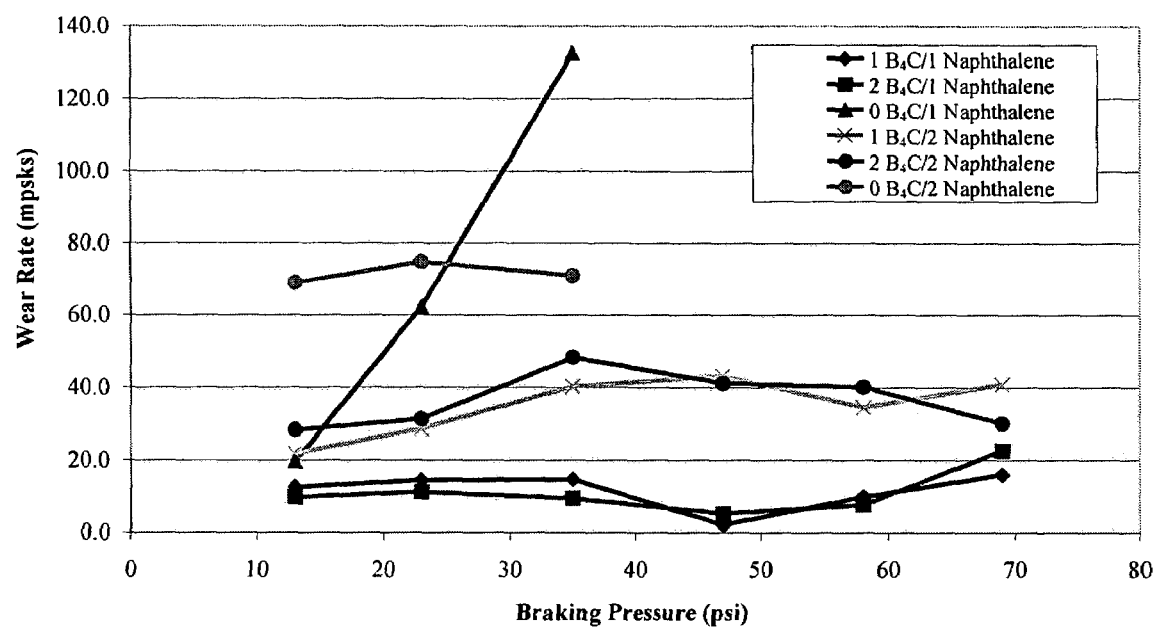
FIG. 12 is a graph illustrating both the effect of boron carbide addition and naphthalene infiltration on the average wear rate of a CMC sample processed in accordance with this invention.
Figure 13:
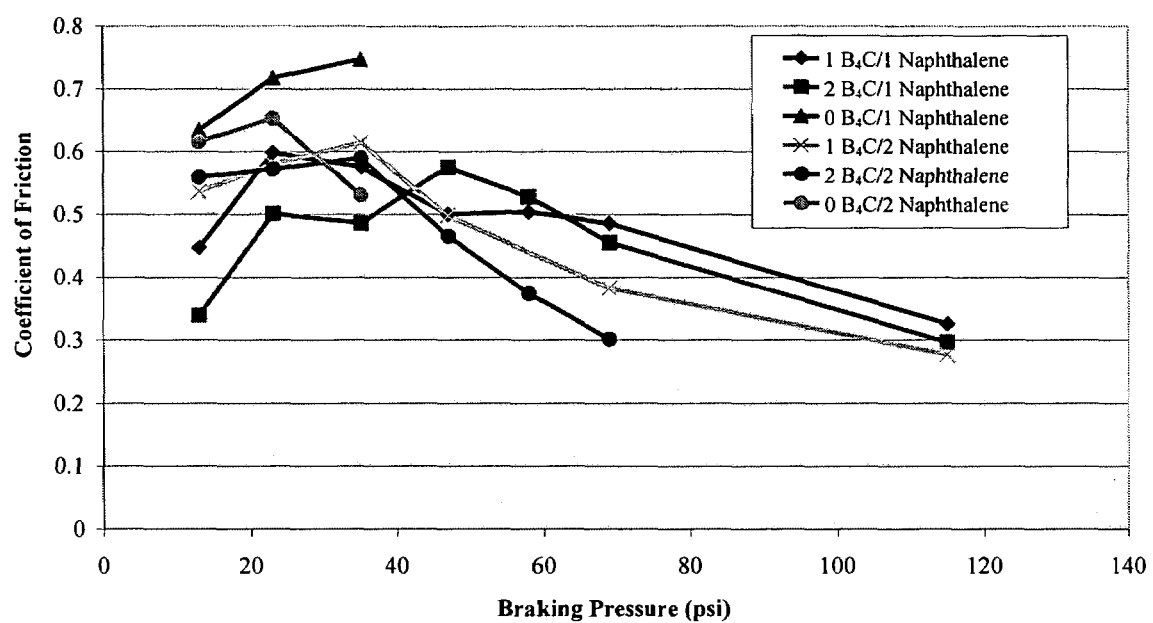
FIG. 13 is a graph illustrating both the effect of boron carbide addition and naphthalene infiltration on the average coefficient of friction of a CMC sample processed in accordance with this invention.

FIGS. 12 and 13 illustrate a material made according to a preferred embodiment of the instant invention, using all the steps described above, having a minimum amount of boron carbide and one naphthalene infiltration and pyrolysis. As described above, the minimum amount of boron carbide is the amount needed to prevent large grain growth. As seen from these FIGS. 12 and 13, materials with no boron carbide experienced extremely high wear. Similarly, materials with two naphthalene impregnations also had higher wear levels.

The next step of the process is melt infiltration. Optionally, the processed green body can be heat treated in an inert atmosphere prior to the melt infiltration with the silicon. It is believed that this step would open up the green body structure and enable the green body structure to be more receptive to the melt infiltration.

After forming the carbon char on the green body infiltrated with liquid carbon precursor, and performing any of the optional steps described above, the processed green body is melt infiltrated with molten silicon. The molten silicon can be pure silicon cover mix or a silicon alloy cover mix that is added to the processed green body infiltrated with liquid carbon. If desired, the green body can be dried to remove any residual water prior to the addition of the cover mix. The green body is covered with a cover mix.

During the melt infiltration step, partial conversion of the silicon and the carbon from the char to silicon carbide takes place. Generally, the melt infiltration step occurs at a temperature range of about 1425° C. to about 1485° C. and takes approximately thirty minutes to two hours. Preferably, the melt infiltration step is carried out at 1460° C. for approximately one hour. The length of this step as well as the actual temperature used can be determined based upon the desired conversion.

A thermal annealing process may be carried out after the melt infiltration of the silicon to react the carbon char with silicon in the green body to form a silicon carbide matrix. The time and temperature of this step must be controlled in order to prevent the undesired reaction between the silicon and the CVD carbon and carbon fibers as well as warpage and delamination. The thermal annealing process substantially completes the silicon carbide forming reaction. It is desirable to react as much of the silicon in the preform to form silicon carbide and to obtain the minimal amount of residual silicon in the CMC. Preferably, less than 5 volume % residual silicon should be left in the CMC after the thermal annealing process. If the silicon reaction occurs to this level during the melt infiltration step, it may not be necessary to carry out a separate annealing step.

For example, it may be possible to combine the melt infiltration step with the heat treatment step provided by maintaining the temperature of 1460° C. for approximately two hours. The exact temperature and amount of time for the melt infiltration can easily be determined by one of ordinary skill in the art to achieve the desired less than 5 volume % of residual silicon in the CMC.

If a separate annealing process is used, the annealing process involves heating the green body to a temperature of about 1350° C. to about 1500° C. for a predetermined period of time. The predetermined time can range anywhere from thirty minutes to two hours. Preferably, the process is carried out for an hour at a temperature of about 1440° C. to about 1445° C. The silicon carbide matrix formed during the thermal process has a grain size that is dependent upon the temperature and time of the annealing process and the amount of boron carbide in the green body. To maintain minimal wear and friction sensitivity, the silicon carbon grain size is preferably less than about 5 microns. Accordingly, in a preferred embodiment, the green body has a boron carbide concentration of about 5 to about 15 vol. % and the annealing process is carried out at about 1450° C. for about 30 minutes to about 90 minutes and, more preferably, for about 60 minutes. The final composite material so formed has a bulk density of about 2.1 to about 2.2 g/cc.

Fabricating the composite material to have a silicon carbide matrix of relatively small grain size minimizes the formation of silicon nodules at wear surfaces of the composite during braking. Where excess silicon is present in the composite, energy transferred during the braking process causes silicon to melt at the wear surface of the brake. The molten silicon layer acts as a lubricant and reduces the friction coefficient of the material. Further, as the silicon cools near the end of the braking process, it re-solidifies on the wear surface causing the coefficient of friction to rapidly increase. The rapid increase in the coefficient of friction near the end of the braking process as the vehicle comes to a stop can cause undesirable vibration in the braking system.

The fabrication and evaluation of SiC-based CMC materials was carried out for comparison purposes. The fabrication process used was a variation described below of a slurry casting ("SC")/melt infiltration ("MI") (collectively "SC/MI") process previously developed by The Carborundum Company for the preparation of SiC/SiC composites. See: U.S. Pat. No. 5,296,311, "Silicon Carbide Reinforced Reaction Bonded Silicon Carbide Composite", McMurtry et al., issued Mar. 22, 1994; U.S. Pat. No. 5,436,042, "Shaped Green Ceramic Fabric Preform Segments for Fiber Reinforced Composite Article", Lau et al., issued Jul. 25, 1995; U.S. Pat. No. 5,484,655, "Aluminum Nitride-Coated Silicon Carbide Fiber", Lau et al., issued Jan. 16, 1996; U.S. Pat. No. 5,643,514, "Process for Manufacturing a Silicon Carbide Composition", Chwastiak et al., issued Jul. 1, 1997; U.S. Pat. No. 5,817,432, "Silicon Carbide Reinforced Reaction Bonded Silicon Carbide Composite", Chwastiak et al., issued Oct. 6, 1998; U.S. Pat. No. 5,840,221, "Process for Making Silicon Carbide Reinforced Silicon Carbide Composite", Lau et al., issued Nov. 24, 1998; and U.S. Pat. No. 5,945,062, Silicon Carbide Reinforced Reaction Bonded Silicon Carbide Composite", Chwastiak et al., Aug. 31, 1999.

The Carborundum CMC system starts with a SiC fiber-reinforced preform coated with a CVD BN, AlN or $TiB_2$ interface coating. This preform is then impregnated with an aqueous slurry containing SiC powders with a bi-modal particle size distribution. The slurry-impregnated preform is then heated to 1410° C. and infiltrated with molten silicon. With a hold time of 30 minutes or less, the final infiltration results in a near full-density CMC, with a SiC—Si two-phase matrix, commonly referred to as a Melt-Infiltrated SiC ceramic matrix composite (MI/SiC CMC).

Specimens were prepared in accordance with the foregoing published Carborundum process, which was modified to include carbon fiber preforms rather than the SiC fiber preforms taught by that process. Further, the carbon fiber preforms were CVI coated with carbon, rather than being coated with a fiber interface coating such as BN, AlN or $TiB_2$ as taught by the Carborundum patents listed above.

The High Speed Friction Tester (HSFT) was used to preform friction and wear (F&W) screening on the specimens tested, including those of the co-pending application and this application. The specimens were formed into rotor/stator pairs of 0.375-inch thick samples with a 1.55 $in^2$ friction interface, 2.25 inches OD and 1.75 inches ID. The disks are mounted on ceramic insulators, and a thermocouple in the rotor, 0.05 inch from the wear face, records temperature, normally 500-1500° F. Normal force and torque on the stator are measured in a series of stops from 5000 rpm (43.6 ft/sec), which last about 50 seconds. Data are recorded each 0.008 sec. and averaged each 0.55 sec.; these averages are stored, and the average friction coefficient µ, the temperatures and the loads were recorded for a series of stops at fixed pressure, normally between 38 psi and 76 psi on the friction surface. Loads up to 130 psi were applied to obtain high temperatures representative of normal energy or Rejected Take-Off ("RTO") stop conditions. Thickness change at 7 locations around the wear face is measured after each series with a micrometer. A typical standard "up" test sequence used for evaluating CMC materials is 400 stops at 13 psi, 200 stops at 23 psi, 200 stops at 35 psi, 200 stops at 47 psi, 200 stops at 58 psi, 200 stops at 69 psi, and (if an acceptable amount of the wear surface remains and oxidation of the material is limited) stops at 130 psi ( about RTO condition). The use of the term "up" indicates that the pressure is increased for each set of stops, beginning at 13 psi and ending up at 69 psi (or 130 psi if acceptable wear surface remains). Typical "down" testing for evaluating CMC materials would be 200 stops at 69 psi, followed by 200 stops at 58 psi, followed by 200 stops at 47 psi, followed by 200 stops at 35 psi, followed by 200 stops at 23 psi, and then followed by 400 stops at 13 psi.

Figure 2:
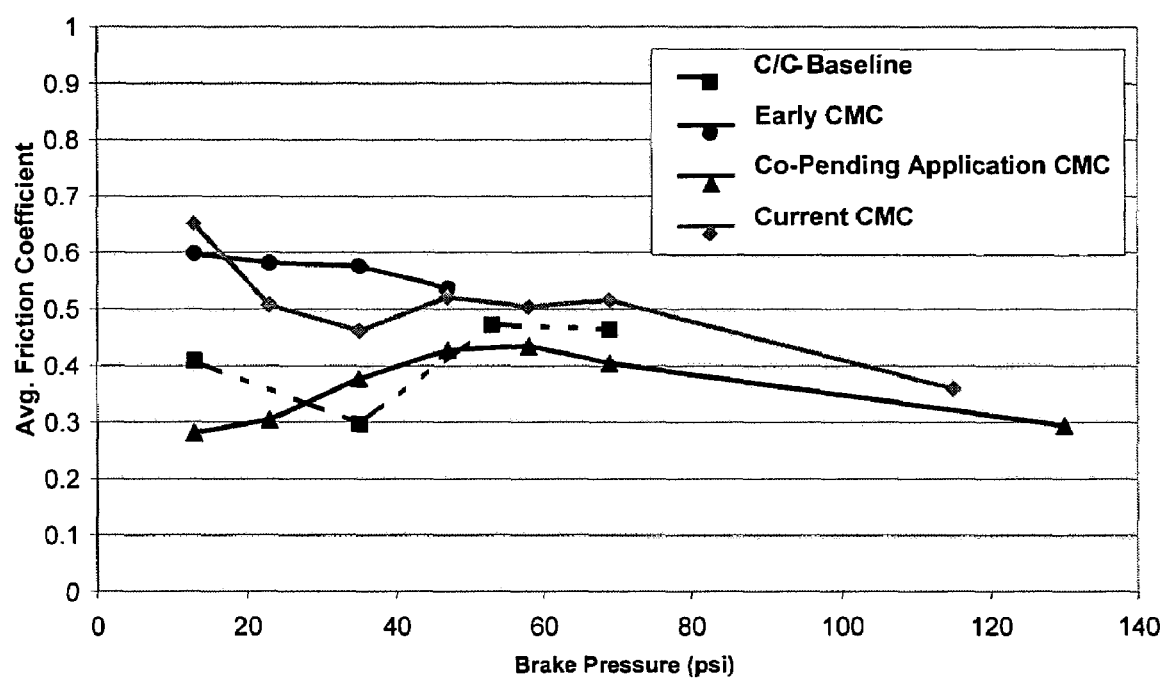
FIG. 2 is a graph comparing the coefficients of friction of various $B_4C$ CMCs as described in the co-pending application with each other and with CMCs prepared according to this invention and commercial C—C materials.

Typical testing is depicted in FIGS. 1 and 2 of the drawings. Average wear rate (mils per surface per 1000 stops) is compared for each series, and wear rates after wear-in are compared, usually for the last 200 stops. The "Baseline C/C" is a Duracarb® material. The "Early CMC" is a sample made using SiC particulate as described above. The "Co-Pending Application CMC" is a sample made using the process of the co-pending application. "Current CMC" is a sample made in accordance with this invention, version 2 (Current CMC, v.2). Not only were these samples tested for wear, but the HSFT was used to assess the effects of ceramic additions on friction coefficient (µ) and wear of carbon brake samples and not the full brake disks.

However, while low wear rates of the samples were achieved at low brake pressures for the Early CMC, the wear rates at higher pressures often jumped to orders of magnitude higher than that of a typical C—C material.

Figure 3:
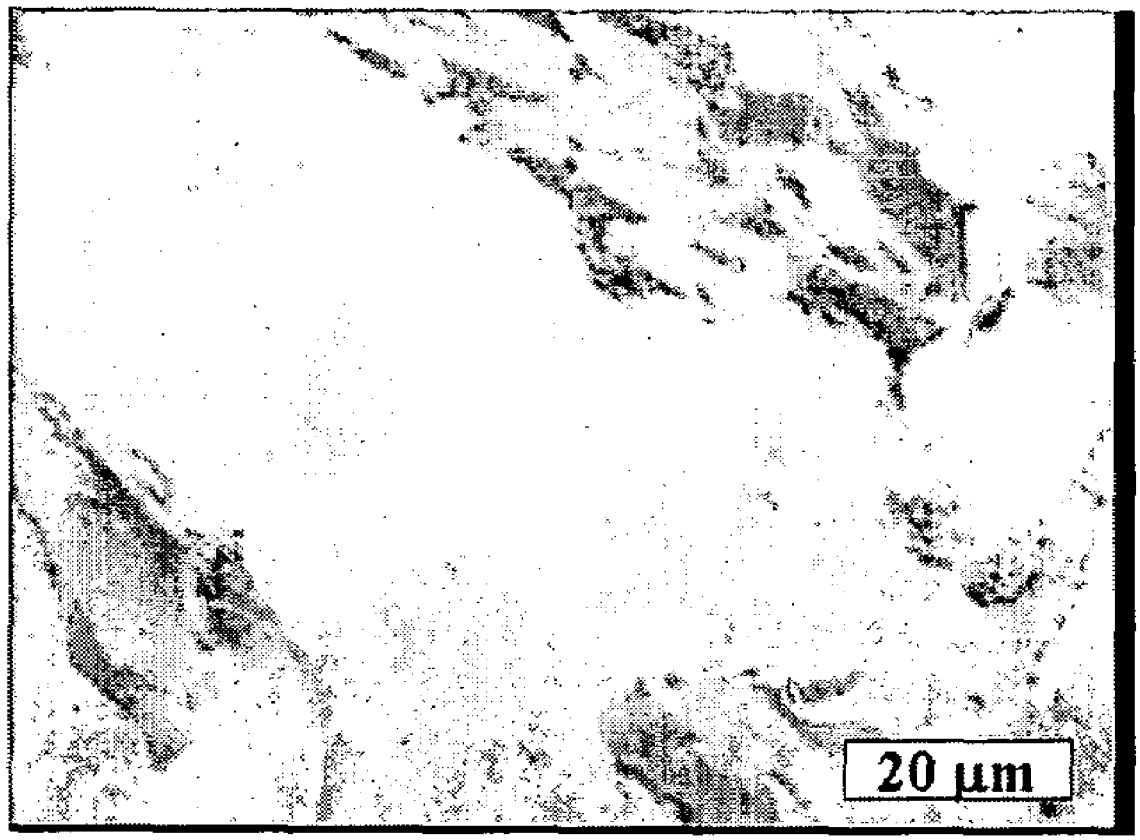
FIG. 3 is a photo micrograph showing a melt infiltrated-SiC CMC exhibiting large SiC crystals formed by C—Si interaction and recrystallization.

Post test characterization revealed that large SiC grains found in the MI-SiC CMC matrix were likely responsible for the high wear rate. Although the starting SiC powders used in the slurry were very fine (mostly below one micron in size, with a small fraction in the 5 micron range), large SiC crystals (significantly larger than 20 microns) were prevalent in the CMC matrix after melt infiltration processing at about 1420° C. (see photo micrograph in FIG. 3). On the other hand, most of the starting fine SiC powder particles had virtually disappeared. The presence of the large ($\geq 20$ microns) SiC crystals, instead of the <1 micron SiC particles, may be causing the increase in the wear rate. Since these large SiC crystals were more abrasive than the finer particles, an analogous behavior would be found in the use of coarse grit sand paper instead of fine grit sand paper.

Detailed examination of the post-melt-infiltration material labeled Early CMC indicated the occurrence of the C interaction with liquid Si, and recrystallization, a process resulting in a microstructure containing large (>20 micron) alpha-SiC grains embedded in large "pools" of Si. The fact, that these grains were much larger (>20 micron) than the original alpha-SiC particles (mostly <1 micron) used in the starting SiC slurry, is indicative of an interaction between liquid Si and the CVD carbon coating during the melt infiltration process followed by the process of recrystallization of the SiC.

Figure 4:
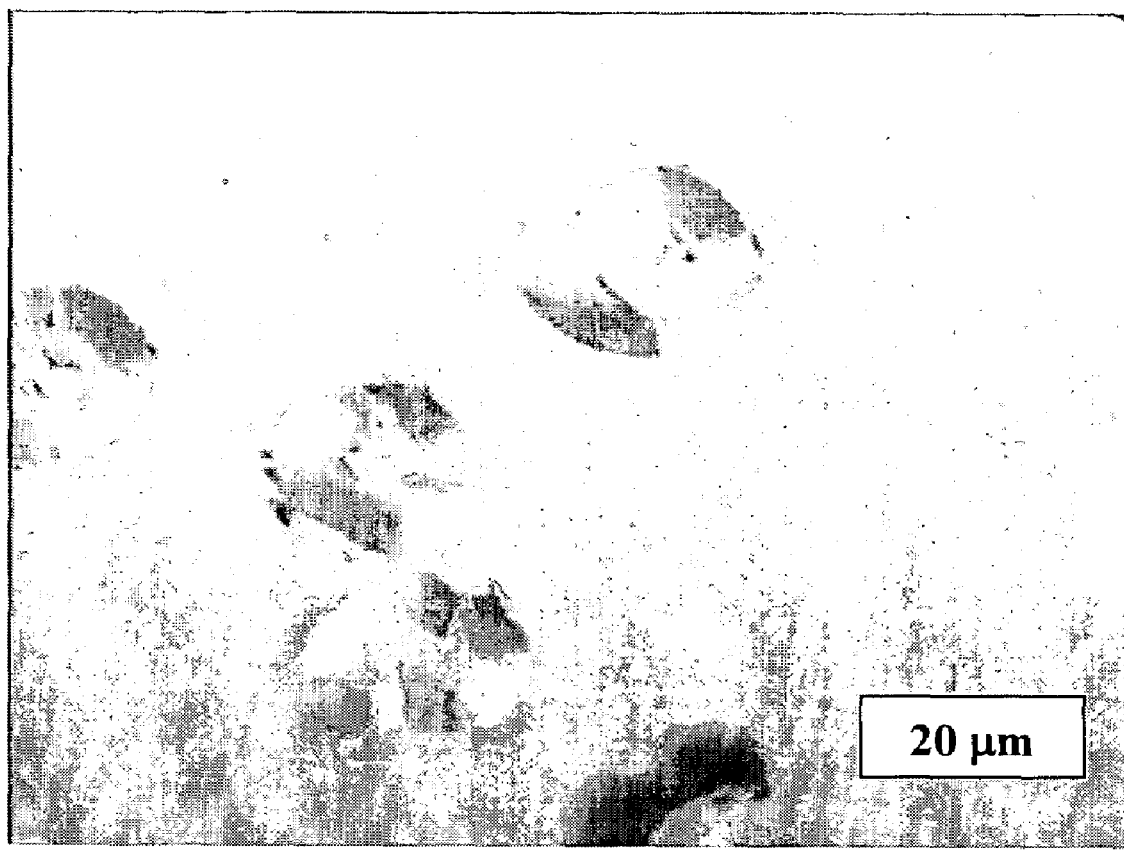
FIG. 4 is a photo micrograph showing a melt infiltrated-$B_4C$ CMC, described in the co-pending application, exhibiting uniform distribution of fine $B_4C$ particles.
Figure 5:
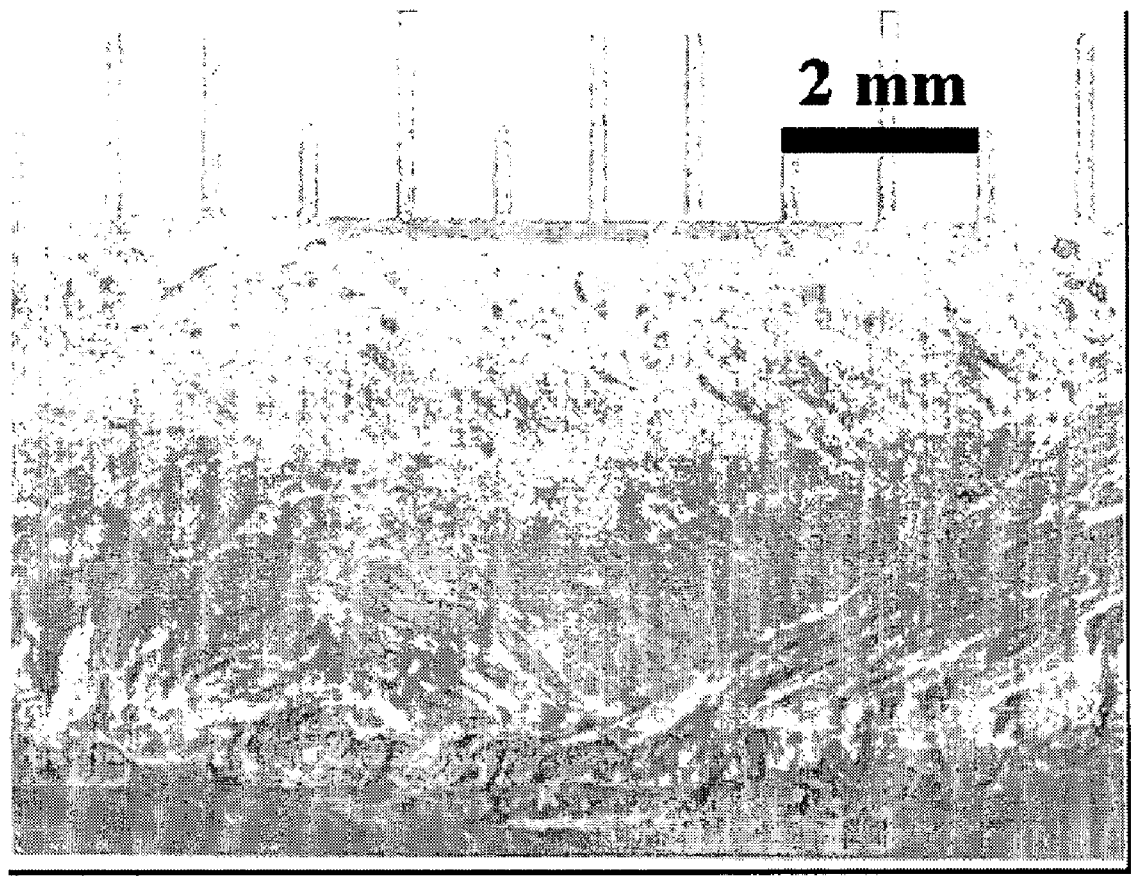
FIG. 5 is a photo micrograph of a conventional C—C material after abbreviated high speed friction testing, because of the severe amount of wear on the samples that precluded additional testing.
Figure 9:
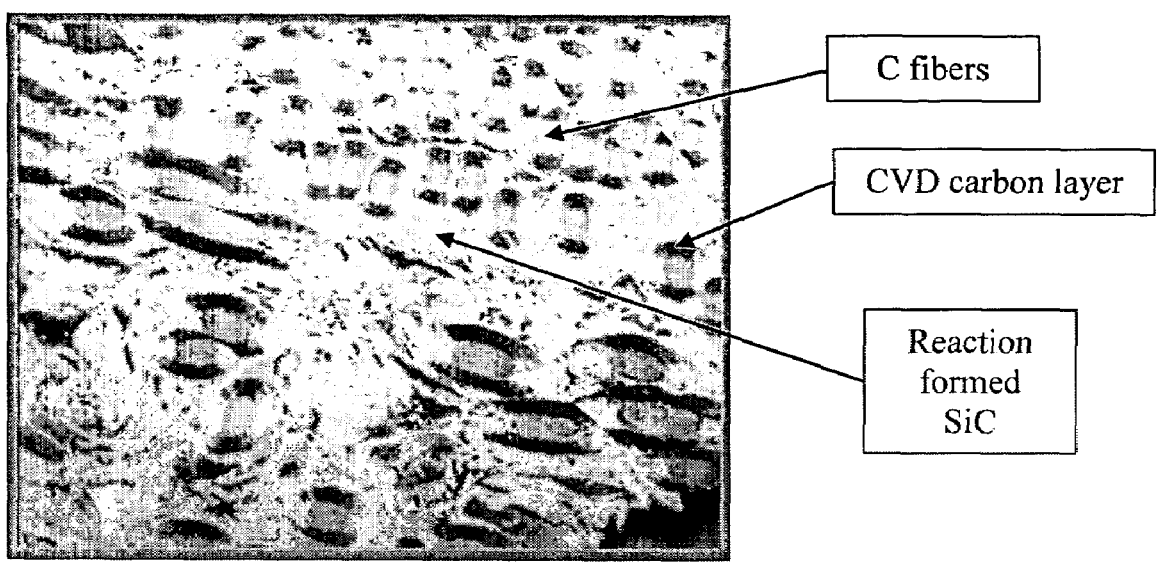
FIG. 9 is a photo micrograph showing a melt infiltrated CMC, made in accordance with this invention, exhibiting an absence of large SiC particles and grains.

Several $B_4C$-based slurry cast, melt infiltrated CMC test specimens were prepared in an attempt to solve the problems of large SiC crystal formation. In contrast to the SiC materials, these $B_4C$ slurry cast materials were indeed found to exhibit a uniform distribution of sub-micron $B_4C$ particles throughout the matrix without the prevalence of large crystals. FIG. 4 is a photomicrograph showing uniform distribution of fine $B_4C$ particles through the matrix. The process for forming these specimens is described in the co-pending application. Based upon the testing of these specimens, it was believed that the $B_4C$ slurry cast material was predicted to have advantages in regard to wear performance in comparison to the SiC slurry cast material. This invention is a further improvement upon the invention in the co-pending application in that it is an attempt to remove free silicon from the final structure by reacting it with free carbon to form SiC. It is necessary to control the size of the reaction-formed SiC grains to prevent high wearing material. FIG. 9 is a photomicrograph of a melt infiltrated CMC, made in accordance with this invention and exhibiting the lack of large SiC grains.

The most significant advantage of ceramic-based CMC heat sink materials (other than SiC) appears to be their reduction in wear rate, which, based on initial test results, may be at least 50%. The increased life may possibly cut the actual cost of aircraft brake operation by a substantial and significant amount. Such ceramic-based CMC materials may possibly support brake life up to double that of C—C at a very little increase in brake weight, if any. Furthermore, the materials of the instant invention have improved static friction coefficient and a narrower range of the dynamic friction coefficient, under various operating conditions that may be experienced by an aircraft.

Several $B_4C$-based slurry cast, melt infiltrated CMC test specimens according to this invention were prepared using the following general steps:

(1) Carbon fiber preforms were infiltrated by CVD-carbon both to deposit a surface coating and to partially fill the fiber bundles while leaving a porosity level of about 20-60%. Typically, the starting fiber volume of the perform is in the range of about 22 to about 27 volume %.

(2) An aqueous $B_4C$-based slurry was prepared by mixing sub-micron $B_4C$ powder with the appropriate additives including wetting agents, and dispersants. (Although submicron powder was used in this specific testing, it has now been established, so far, that particle sizes up to about 10 microns can be used with quite satisfactory results.)

(3) The coated carbon preform was soaked in a tank with the $B_4C$ slurry to impregnate the preform pores with $B_4C$ particles to form a green body.

(4) The slurry infiltrated part was oven dried in air to remove any remaining water at temperatures of about 150 to about 200° F.

(5) After drying, the $B_4C$ impregnated green body is infiltrated with liquid naphthalene and then pyrolyzed to form a matrix of glassy char in accordance with the process described in U.S. Pat. No. 6,309,703.

(6) The green body was placed in a vacuum furnace and infiltrated with molten silicon (which can be alloyed with other elements) to form a near a composite having a residual porosity level of about 10 to about 1 volume %.

The carbon preforms used in these examples were prepared by needle punching layers of PAN tow as described above. Preforms treated according to the process of the co-pending application as well as the instant invention are described below:

Preform Materials Tested

| Component | Co-pending Application | Present Application |
|---|---|---|
| Fiber | 22 vol. % | 22 vol. % |
| CVD Carbon | 20-45 vol. % | 20-45 vol. % |
| Boron Carbide | 15-30 vol. % | 5-15 vol. % |
| Silicon | 15-30 vol. % | <5 vol. % |
| SiC | <5 vol. % | 20-40 vol. % |

The current preferred $B_4C$ powder has a 50% particle size of 0.8 microns or less, although any powders with average particle range of <1.0 to about 10 microns may be used. The powder is milled to break up spray dried agglomerates. If necessary, the pH of the slurry may be controlled to keep the particles from settling out of the slurry. A preferred slurry mix is:

2475 grams deionized Water (medium),
600 grams boron carbide (powder),
5.4 grams ByK®-181 Anionic Dispersant from ByK-Chemie,
10.5 grams ByK®-156 Wetting Agent from ByK-Chemie.
Which yields about 20 wt % solids.

The ByK®-181 (also known as Disperbyk®-181) and the ByK®-156 (also known as Disperbyk®-156) were obtained from Byk-Chemie USA, 524 South Cherry Street, Walling-ford, Conn. 06492. The boron carbide ($B_4C$) used was designated as TETRABOR® 3000 F and was produced by Elektroschmelzwerk Kempten GmbH of Kempten, Germany and obtained in the USA from Wacker Chemical; it had an average Brunauer-Emmett-Teller ("BET") surface area of 12 $m^2/gr$-14 $m^2/gr$.

In preparing the slurry, the various components are measured and mixed together. The mixture is milled for a minimum of one hour.

The preform was placed into a vessel and the slurry added to the vessel. The preform was covered by the slurry. Preferably, the slurry level is at least one inch above the preform. The vessel was then placed into a vacuum chamber. Alternatively, the vacuum chamber itself can be the vessel.

Typically, the preform is infiltrated for about 30 to about 60 minutes; preferably 45 minutes. The infiltration is done as by soaking the preform in a slurry under vacuum (about 30 in. Hg) until trapped air from the submerged preform is removed. When the preform is first covered with slurry, vigorous bubble generation is observed. As the part infiltrates, the rate of bubble formation decreases and finally stops. At this point, the preform was then removed from the slurry and placed into a drying oven and dried at approximately 150° F. to about 200° F. for about two hours.

Afterwards, a cover mix of silicon is prepared for melt infiltration. The cover mix can be a silicon or a alloyed silicon. Each of these cover mixes will be described in further detail. The cover mix is infiltrated into the green body, typically under vacuum. In the laboratory, for processing, the green body is typically buried in a "cover mix." Currently, for small laboratory parts, a crucible is used to contain the cover mix and a part. Alternatively, for production of multiple pieces of brake disks, the disks are stacked and have the cover mix only on the top and bottom of each piece. In production, half the cover mix needed to densify a given brake disk comes from cover mix on top and half from cover mix below. For production, furnace hardware is arranged so that the furnace itself is a crucible.

The preferred cover mix is prepared in the following manner. Crushed silicon is mixed with additional silicon particles and carbon in the following proportions 45.6% (by weight) of-16 mesh silicon alloy
45.6% (by weight) of-80 mesh silicon particles
6.8% (by weight) of Varcum® 29353 liquid phenolic resin
2.0% (by weight) of Raven™ 1255 carbon black In the laboratory, the silicon particles and carbon black particles are hand mixed together. The phenolic resin is added to the mixture which is then kneaded by hand until it is consistent. Machine mixing may alternatively be used to produce a more or less homogeneous mixture. The mixture is, at this point, designated as a "cover mix" or "silicon source mix" and is now about the consistency of damp sand. This cover mix is generally applied to the top and bottom of the green body in the ratio of about 70% to about 150% (by weight) of the weight of that green body.

In the laboratory, the application of the cover mix to the green body can also be done by, initially, making a temporary form which corresponds to the actual shape and dimensions of the green body to be used. The temporary form holds the cover mix in place in respect to the green body until the cover mix is hardened by the setting of the resin. This procedure is especially preferable for complex shape preforms. Then, the temporary form is removed. Alternatively, the application of the cover mix to the green body may be accomplished by any means readily apparent to those skilled in the art.

Preferably, to speed up the hardening process, the entire assembly (temporary form, green body and cover mix) are placed in a conventional drying oven set to about 130° C. to 160° C. for about 2 hours or until the thermoset resin is hardened. The temporary form is then removed, leaving the green body encased in the hardened cover mix. In the laboratory, this assembly is then placed in a Centorr® electric furnace. The Centorr® hi-temperature graphite heating element vacuum furnace has a temperature capability of 2200° C. and a usable uniform hot zone of 16" diameter×12" high. A Honeywell® DCP 700 programmable controller is used to control the temperature heat-up profile and it is also setup for "cascade" control. This type of control system produces precise control of inside crucible temperature and eliminates, temperature overshoot at final temperature. This furnace is also equipped with a bottom loading table to facilitate loading of heavy loads and is equipped with a Stokes® Microvac® pump which can achieve vacuum levels less than 0.3 torr. The furnace is then pumped to a vacuum level of about 0.6 torr.

The form is then heated according to the following temperature profile in the furnace when a non-alloyed silicon cover mix is used:

Room Temperature to 500° C. at 80° C. per hour
500° C. hold for 1.0 hours
500° C. to 1200° C. at 120° C. per hour
1200° C. hold for 1.0 hours
1200° C. to 1460° C. at 120° C. per hour
1460° C. hold for 1.0 hour
Cool Down, Furnace rate Next, the furnace is shut off and left to cool down to about room temperature before removing the composite part which is produced by the now infiltrated green body. The Si in the cover mix melts and is absorbed by the $B_4C$ infiltrated green body through capillary action and fills the interstitial space in the preform, densifying significantly, in many cases to less than 2% open porosity. The excess spent cover mix is cleaned off the part by scraping, leaving a clean and densified composite specimen.

The minimum temperature which, will allow for full infiltration is the preferred temperature to be used. Reactions will occur between Si and uncoated carbon fibers to form SiC. This is to be avoided to the extent possible, thus the minimum temperature is used and the carbon fibers are preferably completely coated or encompassed (essentially encapsulated) with a separate layer of CVD elemental carbon. There is some reaction of CVD carbon (coated onto the carbon preform) with the molten Si, but it is difficult to readily and easily measure thickness of this reaction, although the thickness can be measured using optical microscopy, scanning electron microscopy and/or transmission electron microscopy. The object is to confine the Si and C reaction to the CVD carbon coating on the fiber, avoiding the same reaction with the underlying carbon fiber itself. This allows the carbon fiber to "move" within the CVD carbon coating, thus assuring "pull out" of the carbon fibers during toughness fracture testing.

Alternatively, the cover mix comprises 90 to 92 vol. % of crushed silicon alloy, 5.5 to 7.5 vol. % of the liquid phenolic resin such as Varcum® 29353 Phenolic Resin, and 1 to 3 vol. % of carbon black such as Raven™ 1255 carbon black. The silicon alloy preferably comprises a melt of 90 to 96 wt. % elemental silicon, 3 to 6 wt. % elemental boron and 0.5 to 2.0 wt. % elemental carbon. As explained hereinafter, the range of elements in the preferred silicon alloy produces what may be explained as an eutectic effect, lowering the melting temperature of the silicon by about 20° C. or slightly more. This eutectic effect seems to diminish and substantially disappear when the above stated ranges of alloying elements are not used. Also, preliminary experimental evidence indicates that additions of Al, Ca, Fe and/or Ni at alloying levels may be useful in significantly lowering the melting point of silicon. The capillary action of the silicon infiltration into the green body becomes somewhat less uniform and complete when the carbon black is eliminated from the cover mix, resulting in potentially the formation of some minor voids in the silicon matrix. The phenolic resin range is set to get sufficient resin into the cover mix to set and harden, but not so much that when the silicon alloy melt temperature is attained, there is an over abundance of carbon which would tend to promote the excess formation of silicon carbide, a material that is to be avoided as is explained elsewhere herein. As with the non-alloyed silicon cover mix, once the cover mix is added to the green body, it is placed in a conventional drying oven to set from about 130° C. to about 160° C. for about two hours or until the resin is hardened.

Alternatively, other resins can be used in the place of the phenolic resin. Examples include epoxy resin, unsaturated polyester resin or vinyl ester resin. The amount of resin to be used in the cover mix in place of the phenolic resin can easily be determined by one of ordinary skill in the art.

The silicon alloy cover mix is produced by starting with elemental silicon powder, of a size that will pass through a 30 mesh screen but not through a 60 mesh screen (−30 +60, U.S. Sieve size). To this is added elemental boron in a size range of −200 +300, U.S. Sieve size. Then carbon black (amorphous carbon powder) is added in a size range to −200 +300, U.S. Sieve size. A preferred silicon alloy cover mix is comprised of 94 wt % elemental silicon, such as for example silicon particulate (16 mesh), available from Globe Metals, 5 wt % elemental boron, such as for example SB Boron 95, available from the SB Boron Corporation and 1 wt % carbon black, such as 1255 Raven Carbon Powder Carbon Black. These components are thoroughly mixed, for example, by hand, and then preferably the mixture is heated to 1450° C. in a vacuum until it melts in graphite crucibles that have been coated with boron nitride powder. After the melt is brought back down to room temperature, it is ground to −16 mesh, U.S. Sieve Size, to produce the silicon alloy.

Alternatively, it has been found that when commercial grades of silicon powder are utilized, an acceptable cover mix can be formed by mixing the silicon, the elemental boron and the carbon black, in the ratio recited above, and, without heating and grinding, but rather using the powder mixture as such for the cover mix.

It should be noted that the foregoing silicon alloy has multiple material phases, as distinguished from a solution which only is a single phase material. It has been determined that the saturation level of molten silicon, for dissolution of carbon, occurs when the carbon level reaches a maximum of less than about 250 ppm, with levels of carbon significantly above that range (e.g., 300 ppm and above) causing a reaction between the carbon and silicon, thus eliminating the possibility of alloying the carbon with the silicon to form a single phase solid solution. Rather, when carbon is introduced to molten silicon, at levels of about 300 ppm and above, there is a chemical reaction between the silicon and the carbon to form SiC. The SiC, which is formed by this reaction, precipitates as solid sub-micron particles, carrying with it much of the remaining un-reacted carbon. It is believed that the addition of elemental boron to this silicon-carbon two-phase alloy enhances the suspendability of the carbon, avoiding unwanted precipitation, thus promoting the inclusion of the boron in the development of a true multi-phase silicon-boron-carbon alloy. The saturation point of boron in molten silicon is about 1.6 wt %, with boron at or below that level going into the multi-phase alloy. It is believed without the carbon, the boron reacts, and the reactant products precipitate where the boron is present at a level above 1.6 wt %.

The processed green body then is subject to an annealing process or heat treatment in a furnace at about 1350 to about 1500° C. for approximately thirty to ninety minutes. Typically, the heat treatment process is carried out for 60 minutes. This process substantially completes the silicon carbide forming reaction.

Post-treatment processing only involves machining. Diamond tools were used to machine the parts, and the disk brake parts were ground flat with parallel faces. The measured bulk density of the final material was from about 1.85 to 2.20 grams/cm$^3$.

In regard to the present invention, the thickness of the reaction layer, between the CVD elemental carbon coating associated with the fibers and the molten silicon, is sub-micron for lower temperatures and short reaction times, and can approach several microns in thickness at higher temperatures and/or where longer reactions times are used. It is important to avoid a total conversion of, the CVD carbon layer to SiC and, also, to avoid any significant conversion of the underlying carbon fiber to SiC. Therefore, a reaction layer is acceptable as long as the CVD carbon layer is not totally consumed by the reaction and the carbon fiber remains essentially unreacted.

As noted above, in the modified Carborundum SiC particulate system, substantial re-crystallization is observed. In the $B_4C$ particulate systems of the present invention, generally, no significant large crystals of SiC were observed.

The resultant composite was comprised of carbon fiber bundles which were partially infiltrated with CVD carbon, and a two phase matrix. Microstructural characterization revealed a matrix comprised of a uniform distribution of disconnected, fine and discrete $B_4C$ particles surrounded by a reaction formed, fine grained SiC crystals as evident from the photomicrograph of FIG. 9.

HSFT specimens from $B_4C$ based MI-CMCs of the co-pending application as well as from this application were tested in the same manner as the SiC based composites. For comparison purposes, similar tests were also conducted on a commercial C—C brake material made by the Goodrich Corporation as currently being used on the Boeing 777 aircraft. The friction and wear test results on these materials are shown in FIGS. 1 and 2.

FIG. 1 compares the wear rates of C—C, SiC based CMCs and $B_4C$ based CMCs of the co-pending application "Co-Pending Application CMC" as well as CMCs of the instant application over a wide pressure range. As can be seen, the wear rate of the $B_4C$ based CMC samples is significantly lower over the entire pressure range. CMC wear rates were measured ranging from ½ to ¼ of the C—C rate at high pressures, and ⅒ to ⅕ of the C—C rate at low pressures. These improvements in wear rate were achieved while maintaining a similar friction coefficient (as shown in FIG. 2) to C—C of approximately 0.40 and similar braking temperature profiles. In comparison, the SiC based materials containing the large SiC precipitates showed much higher friction coefficients and much greater wear rates. FIG. 2 demonstrates the unusual temperature and pressure stability of the $B_4C$-based materials. In addition to the reduced wear rates, this "constant coefficient" is another potential key advantage over C—C whose friction coefficients are known to vary or "fade". For example, full RTO dynamometer testing of production C—C produces a typical friction coefficient of less than 0.20.

Again, referring to FIGS. 1 and 2, for the $B_4C$-based CMC material of the co-pending application and the instant application, a low and uniform wear rate of 10-20 mils/side/1000 stops was measured throughout the full HSFT test sequence from low pressure to high pressure. For the commercial production Boeing 777 C—C brake material, similar levels of coefficients were measured. However, the minimum wear rate obtained was about 40 mils/side/1000 stops, or twice that measured for the current $B_4C$-based CMC material. Furthermore, at low braking pressures, the C—C had wear rates as high as 140 mils/side/1000 stops, or about 7 to 14 times that of the $B_4C$-based CMC material at the same pressures. Many of the problems associated with the performance of the MI-SiC CMC materials have been demonstrated to be not a factor with the $B_4C$-based material. The reason for the superior, performance of the $B_4C$-based CMC material over MI-SiC CMC material can most probably be explained by the fact that the $B_4C$-based CMC material does not have the large crystal growth problem observed for the matrix of the SiC composite, confirming the earlier prediction.

Simulated RTO tests were also conducted on the MI-$B_4C$ CMC HSFT specimens of the co-pending application as well as the instant application. The friction coefficients obtained were found to be in the 0.4-0.6 range, similar to the values obtained at the lower pressures. These are believed to be very respectable numbers for the simulated RTO conditions. The low wear rates, 50% or less than those of the current commercial Boeing 777 C—C brake material, could extend the service life of the brakes, give more landings per overhaul, and/or provide the basis for new heat sink designs with lower weight and/or volume. The uniform friction coefficients over a wide range of braking pressure conditions could produce more stable and predictable braking performance.

The uniform friction coefficients as a function of braking pressure may be key in making the invention an important development for non-aircraft braking applications including large truck and train brakes. While conventional C—C has survived severe train brake test conditions, the test results have demonstrated that the coefficient of friction for C—C is dependent on the energy input. However, the relatively "flat" coefficient of friction measured for the CMC materials of the present invention as well as the co-pending application may make them better candidate materials for such non-aircraft types of braking applications.

Figure 6:
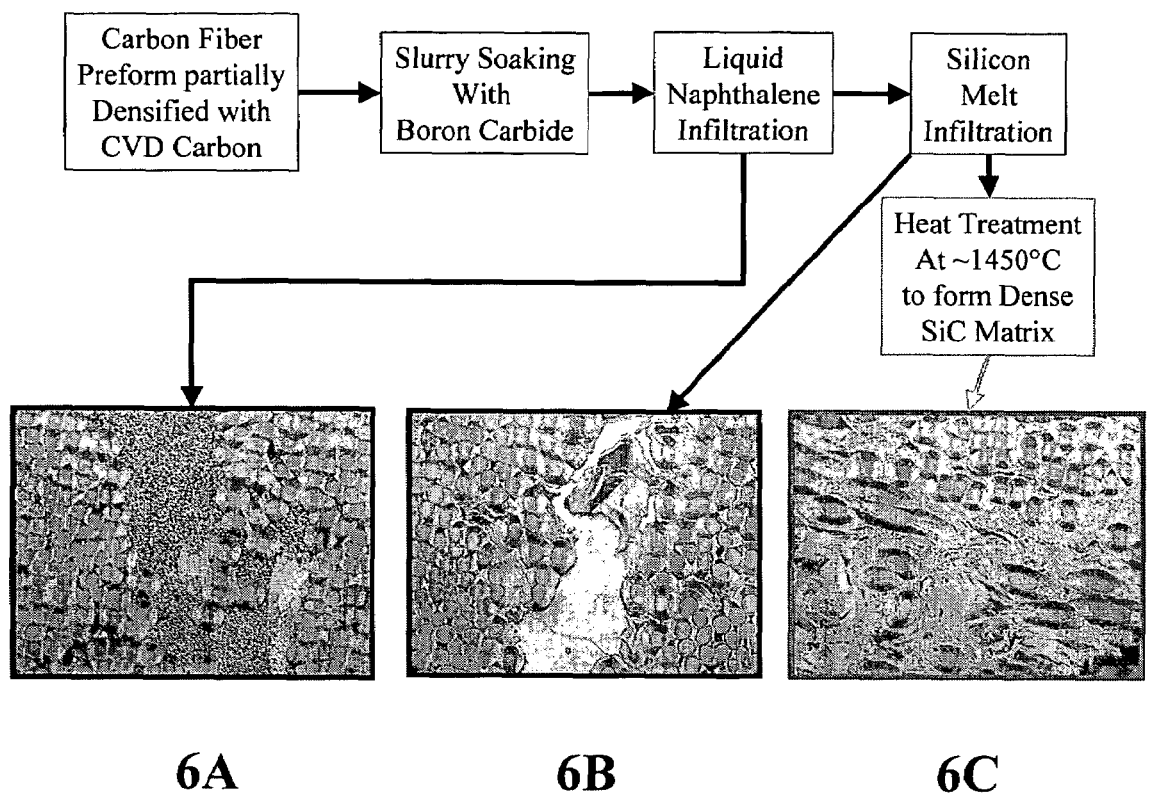
FIG. 6 depicts photomicrographs showing the microstructure of the composite material fabricated in accordance with the invention at different stages of the process.

FIG. 6 includes micrographs taken of the composite material that show the microstructure of the composite at different stages in the process of this invention. Image 6A shows the microstructure of the composite after infiltration and pyrolysis of naphthalene. Image 6B shows the microstructure of the composite after silicon melt infiltration, and image 6C shows the microstructure after the thermal annealing process. The microstructure shown in image 6C reveals that the final composite material includes carbon fibers, unreacted CVD carbon, boron carbide particles and silicon carbide grains, and residual silicon. The residual silicon is estimated to have a concentration in the composite of less than about 5 vol %. The micrograph shows that silicon carbide has the desired fine grain structure of less than 5 microns.

The composite material fabricated in accordance with this invention is estimated to have the following volumetric composition:

| | |
|---|---|
| Fiber | 15-40% |
| CVD Carbon | 20-45% |
| Boron Carbide | 5-15% |
| Silicon | less than 5% |
| Silicon Carbide | 20-40% |

Figure 7:
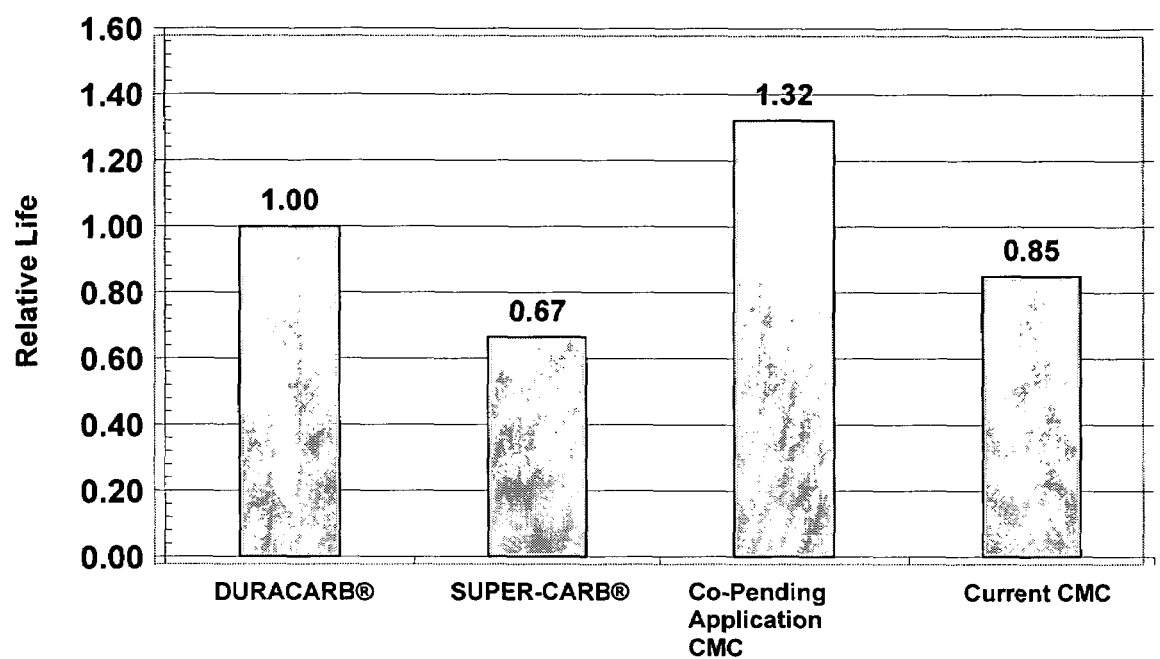
FIG. 7 is a histogram illustrating the relative wear performance for brakes fabricated with CMCs prepared in accordance with the co-pending application as well as the instant invention together with the commercial Duracarb® C—C material and the base line Super-Carb® C—C materials.

FIG. 7 compares the relative wear performance of CMCs prepared in accordance with the process of the co-pending application ("Co-Pending CMC")and embodiments of this invention with baseline Duracarb® C—C materials and Current CMC, version 1. The Co-Pending CMC material is a low coefficient of friction material formulated with submicron sized boron carbide powder. The relative life data is normalized to that of the C/C Baseline material. The relative wear life of the Co-Pending CMC, is superior to either the new and baseline C—C materials and to the Current CMC, version 2.

Figure 8:
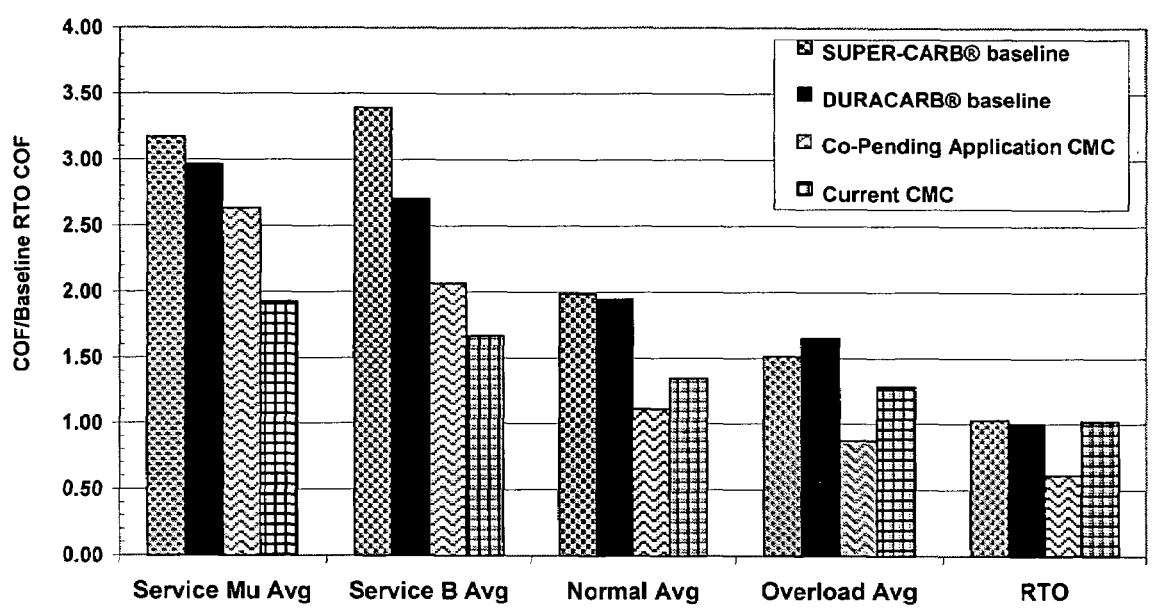
FIG. 8 is a histogram illustrating the relative friction coefficient measured from dynamometer tests carried out to stimulate a variety of braking situations for CMCs prepared in accordance with the co-pending application, the present application together with base line C—C materials.

FIG. 8 is a histogram illustrating the relative friction coefficient measured from dynamometer tests carried out to simulate a variety of braking situations for CMCs prepared in accordance with the process of the co-pending application and the present application (Current CMC, version 2) together with base line C—C materials. The tests cover the range of energies associated with the operational envelope of an F-16 aircraft. The various braking test categories range from "Service A," the lowest energy braking, to RTO, the highest braking energy. The data in FIG. 9 shows that there is less variance in the friction coefficient among the various dynamometer test conditions for the composite material of the present invention, Current CMC, version 2, than for either the C—C baseline material or the composite material of the co-pending application, Co-Pending Application CMC. Further, the data shows that the Current CMC composite has better high energy friction performance, as determined by the overload and RTO test conditions, than the Co-Pending CMC material. Also, the RTO friction performance of the Current CMC material is slightly better than the C—C baseline (Duracarb®) material.

Figure 14:
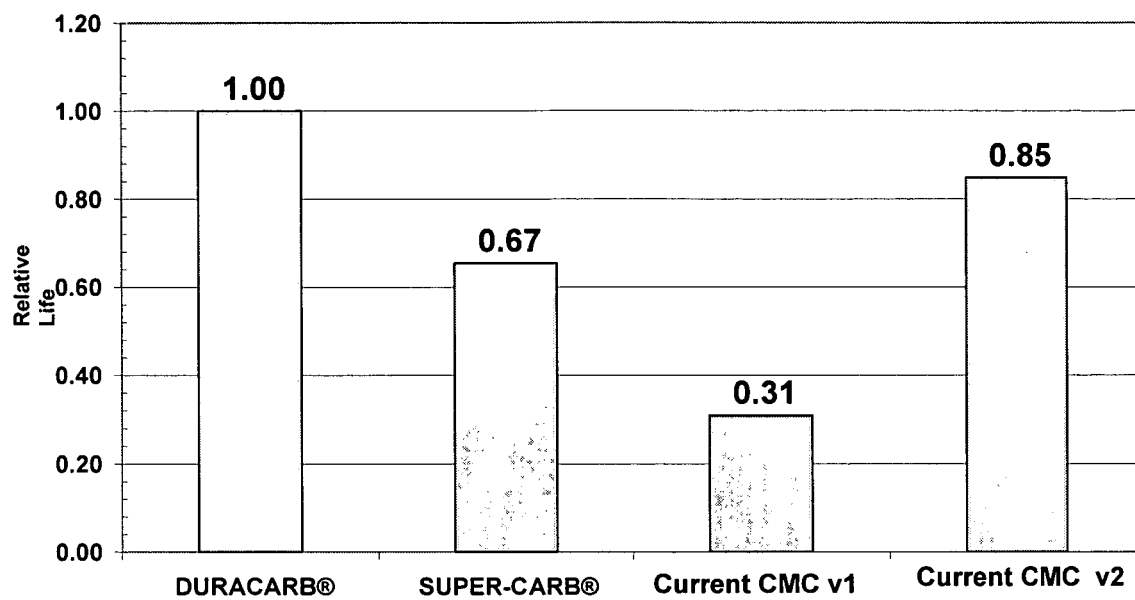
FIG. 14 is a histogram illustrating the relative landings per overhaul of both embodiments of the instant invention together with the commercial Duracarb® C—C material and the Super-Carb® C—C materials.

FIG. 14 describes the wear life of two conventional materials with two embodiments of the present invention. The relative wear rate of a material is measured by running repeated landing cycles. The Figure shows the results of testing demonstrating that the CMC of the present invention can provide a wear rate that is almost a 30% improvement over Super-Carb® materials.

Figure 15:
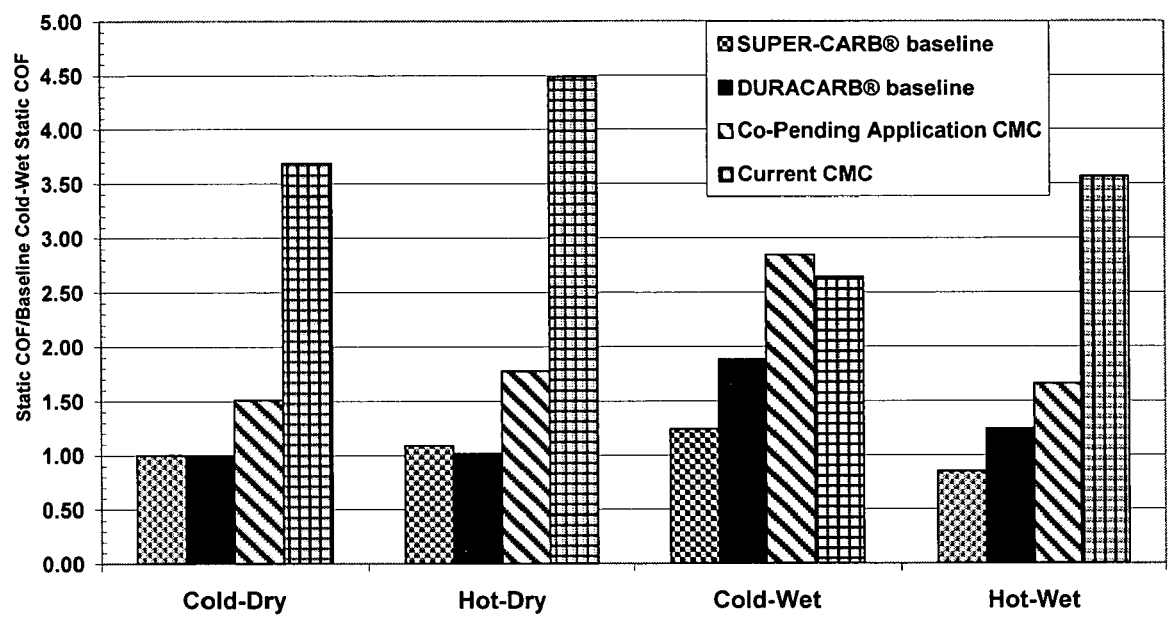
FIG. 15 is a histogram illustrating the relative average static coefficients of friction of both embodiments of the instant invention together with the commercial Duracarb® C—C material and the Super-Carb® C—C materials.
Figure 16:
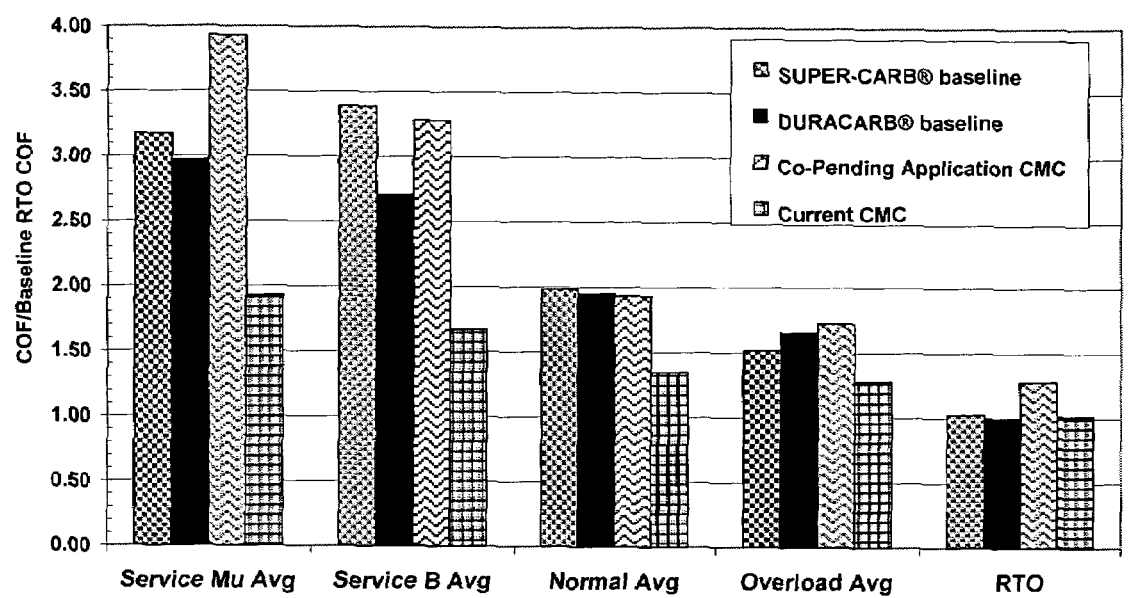
FIG. 16 is a histogram illustrating the relative average dynamic coefficients of friction of both embodiments of the instant invention together with the commercial Duracarb® C—C material and the Super-Carb® C—C materials.

FIGS. 15 and 16 show the relative static and dynamic friction coefficients of the materials of the instant invention as compared to the Super-Carb® and Duracarb® materials. As seen from the Figures, the materials of the instant invention have an improved static friction coefficient as compared to the other materials. Similarly, the materials of the instant invention have a narrower range of dynamic friction coefficient than the Super-Carb® and Duracarb® materials.

The preferred embodiment and the best mode of the present invention, as of the present, have been disclosed, explained, detailed, demonstrated and otherwise described. However, the scope of the present invention is not intended to be limited thereby, but rather is intended to be as broad as the scope of the following claims and their equivalents.

The invention claimed is:

1. A composite material fabricated by a process comprising:
   a) forming a fibrous structure comprising carbon, polyacrylonitrile, or rayon fibers into a preform;
   b) impregnating the preform with elemental carbon to initially predominantly coat the fibers of the fibrous structure;
   c) infiltrating the preform with a ceramic slurry to predominantly impregnate the fibers of the preform to form an impregnated green body;
   d) infiltrating the impregnated green body with a liquid carbon precursor and pyrolyzing the liquid carbon precursor to form a carbon char;
   e) infiltrating the impregnated green body with molten silicon to form a continuous matrix throughout the composite; and
   f) reacting silicon in the continuous matrix with the carbon char to form silicon carbide, wherein said silicon carbide has a grain size of less than about 20 microns and said composite material has less than 5 volume % residual silicon.

2. The composite of claim 1, wherein the ceramic slurry is a boron carbide slurry.

3. The composite of claim 1, wherein said fibers of said preform are made from polyacrylonitrile.

4. The composite of claim 1, wherein said liquid carbon precursor is liquid naphthalene.

5. The composite of claim 1, wherein said molten silicon is a non alloyed silicon.

6. The composite of claim 1, wherein said molten silicon is an alloyed silicon.

7. The composite of claim 1, wherein said fibrous structure is initially coated with chemically vapor deposited elemental carbon.

8. The composite of claim 1, wherein said elemental carbon is deposited on the fibers using pitch or resin.

9. The composite of claim 1, wherein said infiltration with molten silicon occurs in the temperature range of about 1425 to about 1485° C.

10. The composite of claim 2, wherein said boron carbide slurry comprises boron carbide having a particle size of less than about 1 micron.

11. A composite ceramic material comprising:
   a.) a fibrous structure comprising fibers of carbon, polyacrylonitrile, or rayon, and a silicon matrix; wherein said fibers are impregnated with elemental carbon to initially predominantly coat the fibers of the fibrous structure, and wherein said fibrous structure is subsequently predominantly impregnated with boron carbide; and
   b.) a silicon carbide phase comprising silicon carbide and residual silicon, wherein said silicon carbide phase is continuous and predominantly encompasses said fibrous structure, wherein silicon carbide in said silicon carbide phase has a grain size of less than about 10 microns, and wherein said composite ceramic material has less than 5 volume % residual silicon.

12. A composite ceramic material according to claim 11, wherein the amount of residual silicon in the matrix is less than that required to form a liquid phase on the wear face of a disk made from the composite material during a severe energy event.

13. A composite ceramic material according to claim 11, wherein said boron carbide comprises about 5 to about 15 volume % of said material.

14. A composite ceramic material according to claim 11, wherein said fibrous structure impregnated with elemental carbon comprises from about 20 to about 45 volume % of said material.

15. A composite ceramic material according to claim 11, wherein said silicon carbide phase comprises from about 20 to about 40 volume % of said material.

16. A composite ceramic material according to claim 11, wherein said boron carbide has an average particle size of less than about 1 micron.

17. A composite ceramic material according to claim 11, wherein said fibrous structure comprises from about 15 to about 40 volume % of said material.

18. A composite ceramic material comprising:
a.) a fibrous structure and a silicon matrix which are initially predominantly impregnated with elemental carbon, and subsequently predominantly impregnated with boron carbide; and
b.) a silicon carbide phase comprising silicon carbide and residual silicon wherein said silicon carbide phase is continuous and predominantly encompasses said fibrous structure, wherein silicon carbide in said silicon carbide phase has a grain size of less than about 10 microns, whenever said fibrous structure comprises fibers of carbon, polyacrylonitrile, or rayon or combinations thereof, wherein said fibers are coated with elemental carbon, and said composite ceramic material has less than 5 volume % residual silicon.

* * * * *